(12) United States Patent
Nagata et al.

(10) Patent No.: US 6,487,151 B1
(45) Date of Patent: Nov. 26, 2002

(54) OPTICAL INFORMATION RECORDING AND REPRODUCING SYSTEM WITH OVERWRITE CAPABILITY AND RECORDING MEDIUM FOR USE THEREWITH

(75) Inventors: Ken'ichi Nagata, Hyogo (JP); Kenichi Nishiuchi, Osaka (JP); Eiji Ohno, Osaka (JP); Nobuo Akahira, Kyoto (JP); Kenji Narumi, Osaka (JP)

(73) Assignee: Matsushita Electric Industrial Co. Ltd., Kadoma (JP)

( * ) Notice: Subject to any disclaimer, the term of this patent is extended or adjusted under 35 U.S.C. 154(b) by 1175 days.

(21) Appl. No.: 08/574,306

(22) Filed: Dec. 18, 1995

(30) Foreign Application Priority Data

Dec. 20, 1994 (JP) .............................................. 6-316595
Jul. 24, 1995 (JP) .............................................. 7-187533
Jul. 24, 1995 (JP) .............................................. 7-187534

(51) Int. Cl.[7] .............................................. G11A 7/00
(52) U.S. Cl. .................. 369/47.51; 369/116; 369/59.24
(58) Field of Search .............................. 369/47, 48, 50, 369/59, 116, 124, 124.01, 124.07, 59.1, 59.24, 59.23, 47.1, 47.36, 47.5, 47.51

(56) References Cited

U.S. PATENT DOCUMENTS 4,443,870 A    4/1984  Hazel et al.

(List continued on next page.)

FOREIGN PATENT DOCUMENTS

| EP | 0 206 824 | 12/1986 |
| EP | 0 317 344 | 5/1989 |
| EP | 0 548 981 | 6/1993 |
| EP | 0 594 132 | 4/1994 |
| FR | 2 508 218 | 12/1982 |
| JP | 56-145530 | 11/1981 |
| JP | 60-157740 | 8/1985 |
| JP | 63-229625 | 9/1988 |
| JP | 2-94113 | 4/1990 |
| JP | 2-297724 | 12/1990 |
| JP | 3-116529 | 5/1991 |
| JP | 4-153919 | 5/1992 |
| JP | 4-212718 | 8/1992 |
| JP | 5-166187 | 7/1993 |
| JP | 5-266490 | 10/1993 |
| JP | 5-274675 | 10/1993 |
| JP | 6-12670 | * 1/1994 .................. 369/59 |

*Primary Examiner*—Alan T. Faber
(74) *Attorney, Agent, or Firm*—Merchant & Gould P.C.

(57) ABSTRACT

A recording and reproducing method and apparatus for an optical disk of the phase transition type is provided. This method comprises the steps of deciding at random to invert or not to invert write data that has a predetermined block length; inverting the write data if the decision is to invert the write data; and recording either the non-inverted write data or the inverted write data into the photo-sensitive record layer. A synchronizing signal is recorded before the write data and/or dummy data after the write data in the way such that thermal stress is less likely to occur. A record end position can be determined precisely by detecting a stop pulse.

24 Claims, 33 Drawing Sheets

U.S. PATENT DOCUMENTS

| | | |
|---|---|---|
| 4,480,277 A | 10/1984 | Hara et al. |
| 4,516,163 A * | 5/1985 | Mosuda et al. ............... 360/32 |
| 4,587,648 A | 5/1986 | Ando |
| 4,947,384 A | 8/1990 | Suzuki et al. |
| 5,040,165 A | 8/1991 | Taii et al. |
| 5,050,156 A * | 9/1991 | Barton ....................... 369/116 |
| 5,111,443 A * | 5/1992 | Yokogawa ................... 369/54 |
| 5,151,893 A * | 9/1992 | Yamasaki et al. ........... 369/116 |
| 5,214,635 A | 5/1993 | Satoh et al. |
| 5,216,657 A | 6/1993 | Nishiuchi et al. ............ 369/60 |
| 5,233,593 A | 8/1993 | Ha |
| 5,276,670 A | 1/1994 | Nogami et al. |
| 5,367,514 A | 11/1994 | Kobayashi et al. |
| 5,383,176 A | 1/1995 | Inui et al. |
| 5,388,105 A | 2/1995 | Takagi et al. |
| 5,407,720 A | 4/1995 | Omata |
| 5,448,552 A | 9/1995 | Onagi |
| 5,459,711 A | 10/1995 | Ohta et al. |
| 5,477,524 A | 12/1995 | Deguchi et al. |
| 5,508,995 A | 4/1996 | Moriya et al. |
| 5,546,461 A * | 8/1996 | Ibaraki et al. ................ 380/20 |
| 5,600,627 A | 2/1997 | Hirokane et al. |
| 5,604,726 A | 2/1997 | Karube |

\* cited by examiner

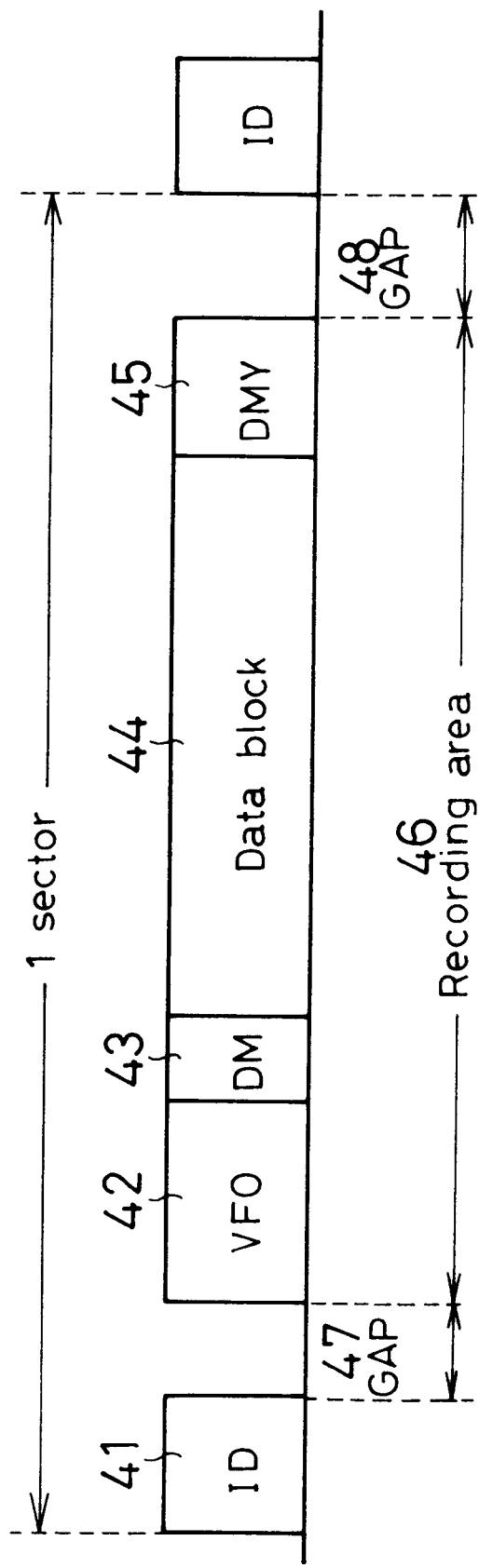
F I G. 21

OPTICAL INFORMATION RECORDING AND REPRODUCING SYSTEM WITH OVERWRITE CAPABILITY AND RECORDING MEDIUM FOR USE THEREWITH

BACKGROUND OF THE INVENTION

1. Field of the Invention

The present invention relates to an optical disk drive for a disk that permits overwriting of a sector of the disk.

2. Description of the Prior Art

As the above optical disk (optical information recording media), a phase transition type system using a chalcogenide as a recording thin film material is known well. This recording thin film is a photo-sensitive layer formed on a substrate, which transfers into a crystal state or an amorphous state by irradiation with a light beam such as a laser beam. The recording layer of the overwritable optical disk of a phase transition type can record data usually by using a crystal state for a non-recorded state and an amorphous state for a recorded state. The amorphous state is generated by irradiating a laser beam to melt the recording layer followed by rapid cooling down thereof. The crystal state is generated for erasing the recorded data by irradiating a laser beam at a lower power to raise-the temperature of the recording layer.

One of the merits of the phase transition type system is that only one laser beam is required and that the disk can be overwritten easily. If the laser beam power is modulated between two levels, i.e., a recording level and an erasing level, according to the write data, erasing old data and recording new data can be performed simultaneously by irradiating the modulated laser beam at the track of recorded data. For example, see Japanese Patent Application No. 56-145530. The phase transition type optical disk having the above merits is widely used for recording (i.e., writing) and reproducing (i.e.,reading) document files, picture image files and other data files.

The overwritable optical disk usually has a guide track in a spiral or in circles that is detected optically, for high density recording and for necessity of dispersed recording. The optical disk drive (i.e., optical disk reader/writer) irradiates a laser beam focused in a diameter of less than 1 μm to the recording layer on the guide track of the optical disk for writing or reading of data.

It is common to divide a track into sectors to record variable length data effectively. Each sector that has usually a memory capacity of 512 bytes or 1024 bytes including the sector ID area including a track address and a sector address, and a recording area for writing and reading of data. An address portion that indicates a physical address of a sector is preformatted at the manufacturing stage.

Usually, a recording format for data recorded in the recording area includes a synchronizing signal (i.e., VFO) portion for drawing in of PLL (Phase Locked Loop), a data head indicating mark (i.e. DM) added to the head of the write data as a kind of synchronizing signal, a modulated data portion and a resynchronizing signal for word synchronizing. In the process of data recording, an address of a target sector ID is read and the data is written into the recording area of the target sector after detecting the address.

There are two recording methods, i.e., a pulse position modulation and a pulse width modulation. In the pulse position modulation, mark positions are detected for reading of data. On the other hand, both ends of marks are detected in the pulse width modulation. The pulse width modulation has an advantage in record density.

The recording and reproducing method of the phase transition type optical disk in the prior art is explained below, referring FIGS. 14 and 15. FIG. 14 illustrates a block diagram of a reader/writer (optical disk drive) in the prior art. FIG. 15 shows write data, a laser power and a recording state of the optical disk for explaining the write/read operation.

As shown in FIG. 14, a system controller 4 connected to a host computer outputs the write information as a binary signal. This write information is provided with error correction information, then encoded in a encoder 7a with e.g., 1–7 RLL. A composer 8 adds a synchronizing signal (VFO) to each data block to be written into each sector so as to generate write data 11a. A laser power controller 12 controls the laser housed in a optical head 3 to modulate the intensity of the laser according to the write data 11a. The system controller 4 also controls a spindle motor 15 to rotate the optical disk.

If the strong laser beam (at laser power Pp) focused by the optical head 3 is irradiated to the recording layer of the optical disk 1 to raise the temperature of the recording layer above its melting point, the spot irradiated by the laser beam is melted and cooled rapidly, and assumes the amorphous state as a recorded mark 20. On the other hand, if the laser beam (at laser power Pb) is focused and irradiated to raise the temperature of the recording layer above the crystalization temperature but below the melting point, the recording layer at the irradiated spot assumes the crystal state. Data recording is performed in the above mentioned way using a difference between the crystal state and the amorphous state.

Data reproducing(reading) from the optical disk is performed using the difference of the optical character of the recording layer between the crystal state and the amorphous state. A weak laser beam (at laser power Pr) is focused and irradiated to the optical disk and a change of a reflected beam is detected as a read RF signal 14 of the recorded data. Then, the signal is converted to a binary signal in a read signal processor 13; it is further processed for decoding and error correction to be a desired read information 6. A similar weak laser beam is irradiated to the optical disk for reading address information when the beam scans the address portion between sectors 18 of the optical disk during the recording process.

However, it is known that repeated recording in a sector of the optical disk of the phase transition type may generate a deterioration that is unique to the phase transition type optical disk. This deterioration causes a reading error. The area of this type of deterioration usually spreads according to the number of times recordings is repeated. Three main patterns of the deterioration are as below:

(1) a defect of the recording layer is generated in a record start portion of a chain of recording areas due to the repeated recording; the defect spreads backward (direction of laser scanning on the disk);

(2) a defect of the recording layer is generated in a record end portion of a chain of recording areas due to the repeated recording; the defect spreads forward (opposite direction of laser scanning on the disk);

(3) a defect of the recording layer is generated in an area where the same pattern mark train is recorded; the defect spreads forward and backward.

Usually rewriting of the optical disk is performed by sectors. Therefore, the whole sector is rewritten even if the recorded data is only changed partly. Especially, a TOC (Table Of Content) area and a directory area of the disk are often written by similar data repeatedly. The above deterioration pattern (3) occurs in such areas.

It is understood that these three patterns of deterioration are all due to a slow migration of the material that forms the recording layer in the laser scanning direction or the opposite direction. However, what drives the recording layer material to migrate during laser irradiation is not known. Some driving forces are conceivable such as surface tension due to a thermal gradient in the recording layer during the laser irradiation or a deformation of the layers making up the optical disk due to a thermal load. If the recording layer has deteriorated, the necessary reflection of the laser beam corresponding to the recorded or non-recorded state of the optical disk cannot be obtained. Some recording methods are proposed to solve these problems so that the performance of rewriting improves. For example, as a solution of the above deterioration pattern (3), there is an optical disk drive that can suppress the deterioration by altering the start position of the VFO recording at every recording. For example, see Japanese Patent Application No. 63-229625. As a solution of the above deterioration pattern (2), there is an optical disk drive that can suppress the effect of deterioration of the waveform that spreads forward (direction toward the record start point) from the record end point by recording a fixed length of dummy data. For example, see Japanese Patent Application No. 2-227724.

In the above writing methods of the prior art, the start position of the VFO writing is altered at every writing, or the fixed length of dummy data is added to the end of the data block to suppress the deterioration of the read data due to the repeated recording. Therefore a dummy data area is necessarily added to the record area of the data block. This means that the recording capacity (byte number) is substantially decreased.

SUMMARY OF THE INVENTION

The object of this invention is to provide a recording/reproducing method and apparatus that can suppress the deterioration of the overwritable phase transition type optical disk due to the repeated recording so that the number of possible overwriting is increased.

In order to achieve this object, a first aspect of the recording/reproducing method of the present invention comprises steps of deciding at random to invert or not to invert write data that has a predetermined block length; inverting the write data if the decision is to invert the write data; and recording either the non-inverted write data or the inverted write data into the photo-sensitive record layer.

By this method, a concentration of the deterioration in a certain spot is avoided even if similar write data are overwritten repeatedly into the same area such as the TOC area. As a result, the deterioration due to the repeated rewriting is suppressed.

A second aspect of the recording/reproducing method of the present invention is characterized in that the write data to be recorded into each sector of the optical information recording medium (i.e., optical disk) includes original write data and dummy data added to the head of the original write data, and that the ratio of the recorded mark distance and the recorded mark length of the dummy data is larger nearer to the head of the dummy data. Similarly, it is preferable to add dummy data following the original write data, and to set the ratio of the recorded mark distance and the recorded mark length of the dummy data larger nearer to the end of the dummy data. Alternately, it is preferable to increase or decrease the laser power (i.e., energy of the light irradiation) slowly in the dummy data area heading or following the write data.

By the above method, the thermal stress to the recording layer as well as the material migration of the recording layer is decreased closes to the head or the end of the dummy data. Consequently, concentration of the thermal stress in the recording layer at the record start or end point is avoided, so that the deterioration of the recorded data at the record start or end point due to the repeated recording can be suppressed.

A third aspect of the recording/reproducing method of the present invention is characterized in that the light irradiation energy for forming the mark of the synchronizing signal is smaller at least in a head area than the light irradiation energy for forming the shortest mark of the original data. By this method, the thermal stress in the area of the synchronizing signal is smaller than in the area of the write data following the synchronizing signal. Consequently, the synchronizing signal can be read correctly after repeated rewriting.

A fourth aspect of the recording/reproducing method of the present invention is characterized in that the synchronizing signal and the write data following the synchronizing signal is recorded/reproduced with a pulse width modulation and that a ratio of a recorded mark distance and a recorded mark length is more than one concerning the mark train recorded at least in a head area of the synchronizing signal. By this method, the thermal stress in the area of the synchronizing signal is smaller than in the area of the write data following the synchronizing signal. As the result, the synchronizing signal can be read correctly after repeated rewriting.

A fifth aspect of the recording/reproducing method of the present invention is characterized in that the record starting point of the synchronizing signal in a sector is fixed, and that the length of the synchronizing signal is altered in a predetermined range at every rewriting. By this method, a migration of the deterioration of the recording layer that occurred at the start point of the synchronizing signal to the write data area is avoided, with minimum decrease of the record capacity.

A sixth aspect of the recording/reproducing method of the present invention is characterized by altering the position of the data head indicating mark in a sector at every writing, recording dummy data after the data block, and altering the length of the dummy data according to the position of the data head indicating mark. By this method, migration of the deterioration of the recording layer that occurred at the end point of the dummy data to the write data area is avoided, with minimum decrease of the record capacity.

A seventh aspect of the recording/reproducing method of the present invention is characterized by altering the position of the data head indicating mark at every writing if the linear speed of the recording position on the disk is dependent on the radius of the position, and altering the largest position shift of the data head indicating mark and/or the average length of the synchronizing signal according to the recording radius.

An eighth aspect of the recording/reproducing method of the present invention is characterized by altering the average length of the dummy data according to the recording radius if the linear speed of the recording position on the disk is dependent on the radius of the position.

A ninth aspect of the recording/reproducing method of the present invention is characterized by stopping the record operation after a change of a light reflection at the disk has been detected during the record operation. By using this writing/reading method and a recording medium that has an area of changed reflection at the end of the recording area, it is possible to record always in the same position of a sector, even if a flutter has occurred in the disk rotation.

The recording/reproducing apparatus according to the present invention includes devices for performing the above recording/reproducing methods.

BRIEF DESCRIPTION OF THE DRAWINGS

FIG. 21 is a chart showing a record format of a sector in the optical disk;

DESCRIPTION OF THE PREFERRED EMBODIMENTS

Hereinafter preferred embodiments of the present invention will be explained with reference to drawings.

First Embodiment

Figure 1:
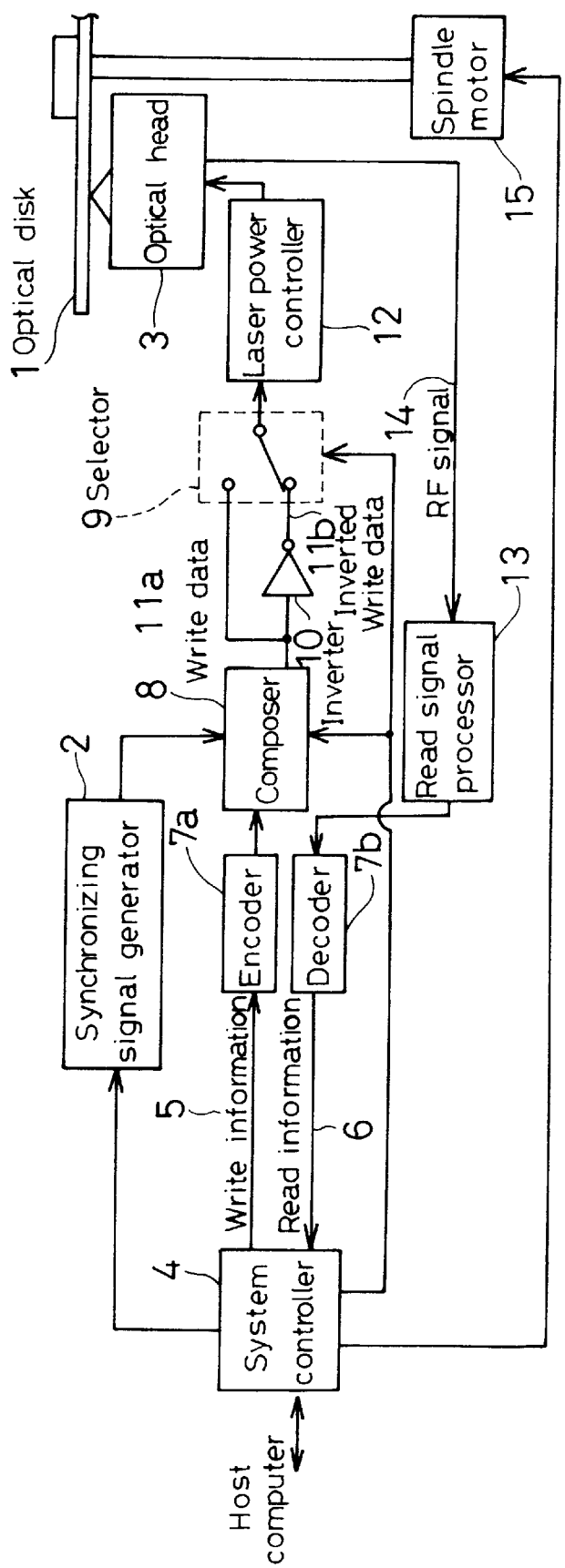
FIG. 1 is a block diagram illustrating the optical disk drive of a first embodiment according to the present invention.
Figure 2:
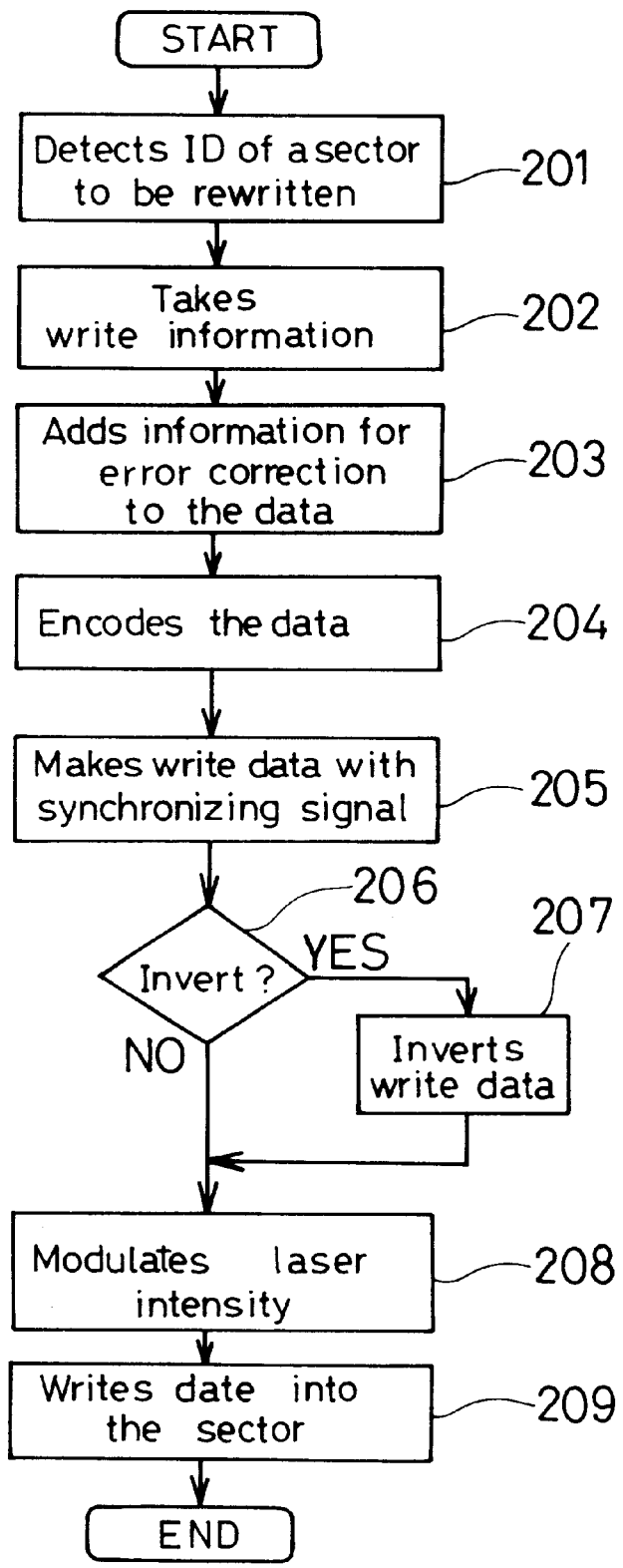
FIG. 2 is a flow chart of the operation performed by the optical disk drive illustrated in FIG. 1 for rewriting a sector of the optical disk.

A block diagram of an optical disk drive or an optical disk reader/writer (i.e. recording and reproducing apparatus) of the first embodiment of the present invention is illustrated in FIG. 1. A flow chart of the process to rewrite a sector performed by the reader/writer is illustrated in FIG. 2. In step 201, the reader/writer detects ID (address data) of the sector to be rewritten. In step 202, a system controller 4 that is connected to a host computer outputs write information 5 in the form of binary data. This write information 5 is provided with information for error correction in step 203 and it is encoded in step 204. In step 205, each data block to be written in a sector is provided with a synchronizing signal (VFO) and other signals, so that write data 11a is made in a composer 8; the synchronizing signal is generated in a synchronizing signal generator 2. The above operation of this reader/writer is similar to the prior art; the following operation is different.

As shown in FIG. 1, the write data 11a is divided into two paths; one path connects to a selector 9 directly; another connects to a selector 9 via an inverter 10 that makes inverted write data 11b (step 207 in FIG. 2). The selector 9 is triggered by detection of the address data of the sector to be rewritten. It selects the non-inverted write data or the inverted write data at random, and holds the selected data until the data is written into the sector. Therefore it is determined by the selector 9 in step 206 whether the write data is inverted or not before writing.

If a reader/writer that accesses sectors of a optical disk (i.e. optical information recording medium) at random is used, selecting the non-inverted write data or the inverted write data alternately by the selector 9 can generate substantially the same situation as selecting at random. In this case there is no need to provide means such as a random number generator. An output of the selector 9, i.e. either non-inverted write data 11a or inverted write data 11b, is given to a laser power controller 12, that performs laser intensity modulation driving a laser housed in a optical head 3 (step 208). Thus the data string is written into the sector of the optical disk.

Figure 3:
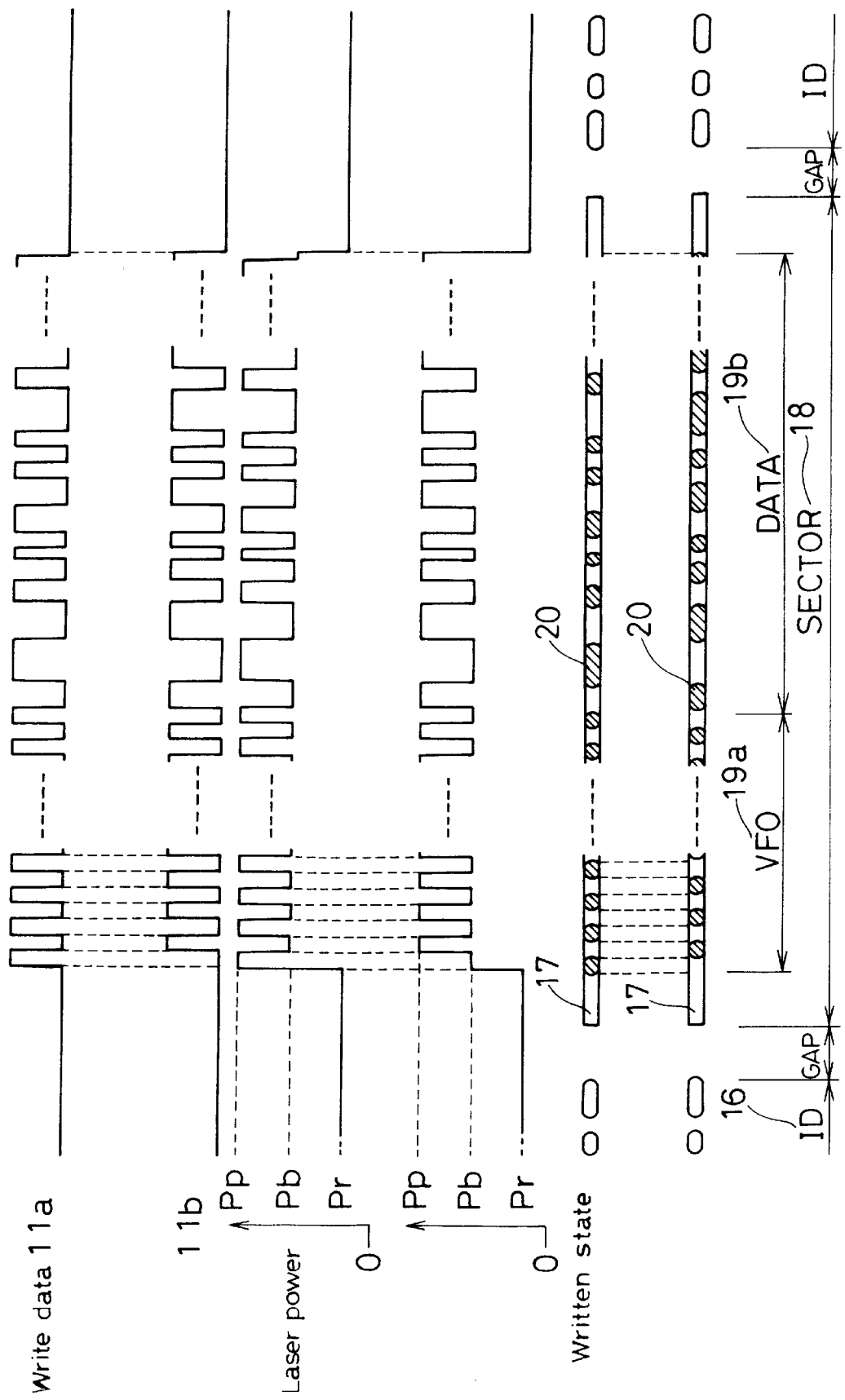
FIG. 3 is a timing chart for the write data, the inverted write data, the laser power and the written state of the optical disk in the optical disk drive illustrated in FIG. 1.

FIG. 3 shows an example of a time chart that includes write data, laser power and written state. Laser power when the inverted write data is selected by the selector 9 has an opposite phase to that when the write data 11a is selected, concerning the level of Pp and Pb. Consequently, amorphous written marks 20 are formed in the opposite phase to each other on the sector of the optical disk.

Therefore, each position in the sector has substantially the same probability of being formed with a written mark, even if the same information is written repeatedly in a sector. Thus damage due to the repeated rewriting in the particular position does not occur.

A concrete example will be explained below. The substrate of the optical disk whose diameter is 130 mm was made of polycarbonate. This polycarbonate substrate was preformatted with uneven phase pits as address information and guide grooves for writing were formed in a sector area. A reflection layer, a photosensitive layer and a protection layer were formed on the substrate. Then, a protecting plate was bonded thereto. The reflection layer was formed with Al; the protection layer was formed with ZnS—SiO$_2$; the photosensitive layer was formed with Te—Sb—Ge.

The optical disk made by the above process was rotated at a linear speed of 5 meters per second. A laser beam that has a 680 nm wave length was focused on the disk for writing by using a lens that has the numerical aperture (NA) of 0.6. The laser power for reading and writing was adjusted to Pp=11 mW, Pb=4 mW and Pr=1 mW. Pulse width modulation (PWM) with 1–7 RLL (Run Length Limited) was used for write data modulation. The shortest mark length and the shortest mark distance were set both at 0.6 µm.

After rewriting the same information into the same sector repeatedly using the above conditions, the jitter value was measured. The measurement was performed in five different numbers of rewriting times, i.e. one, ten, a hundred, a thousand and ten thousand. The information written in a sector had 2970 bytes.

Table 1 shows a comparison of jitter values in this example (example 1), in another example that will be explained later, and in the prior art. In this table, a represents standard deviation of jitter values on zero cross point of read data signal; Tw represents the window width of the detecting system.

TABLE 1

| Times of rewriting | Jitter ($\sigma$/Tw) | | | | |
|---|---|---|---|---|---|
| | 1 | 10 | 100 | 1,000 | 10,000 |
| Prior art | 6.4 | 7.3 | 7.4 | 8.5 | 12.8 |
| Example 1 | 6.2 | 7.1 | 7.0 | 7.4 | 8.3 |
| Other example | 6.2 | 7.2 | 7.1 | 7.2 | 7.6 |

As seen in Table 1, the jitter value in the prior art increases as the number of times of rewriting increases. However, the increasing rate of the jitter value in example 1 by this invention is much lower than in the prior art. This means that deterioration of the read data signal due to repeated rewriting is suppressed in this embodiment of the invention.

If a method disclosed in Japanese Patent Application No. 2-94113 that varies a write start point at random, and the method of the above embodiment of this invention are combined, deterioration of the photosensitive layer may further be suppressed, since the probability of forming a boundary between the area melted/hardened repeatedly and the non-melted area may be substantially uniform over the whole writing area. Such a configuration can be obtained by adding a delay circuit that can control the delay time by steps next to the composer 8, and changing the delay time at random in each sector rewriting. Jitter values of the "other example" in Table 1 are measured in this configuration. It is clear that the increasing rate of the jitter value in the other example is lower than in example 1.

In this embodiment, written mark distance is not varied when write data are inverted, since pulse width modulation is used. Therefore, one decoding method can be used for both non-inverted write data and inverted write data, so the decoder circuit does not need to be complicated.

Second Embodiment

Figure 4:
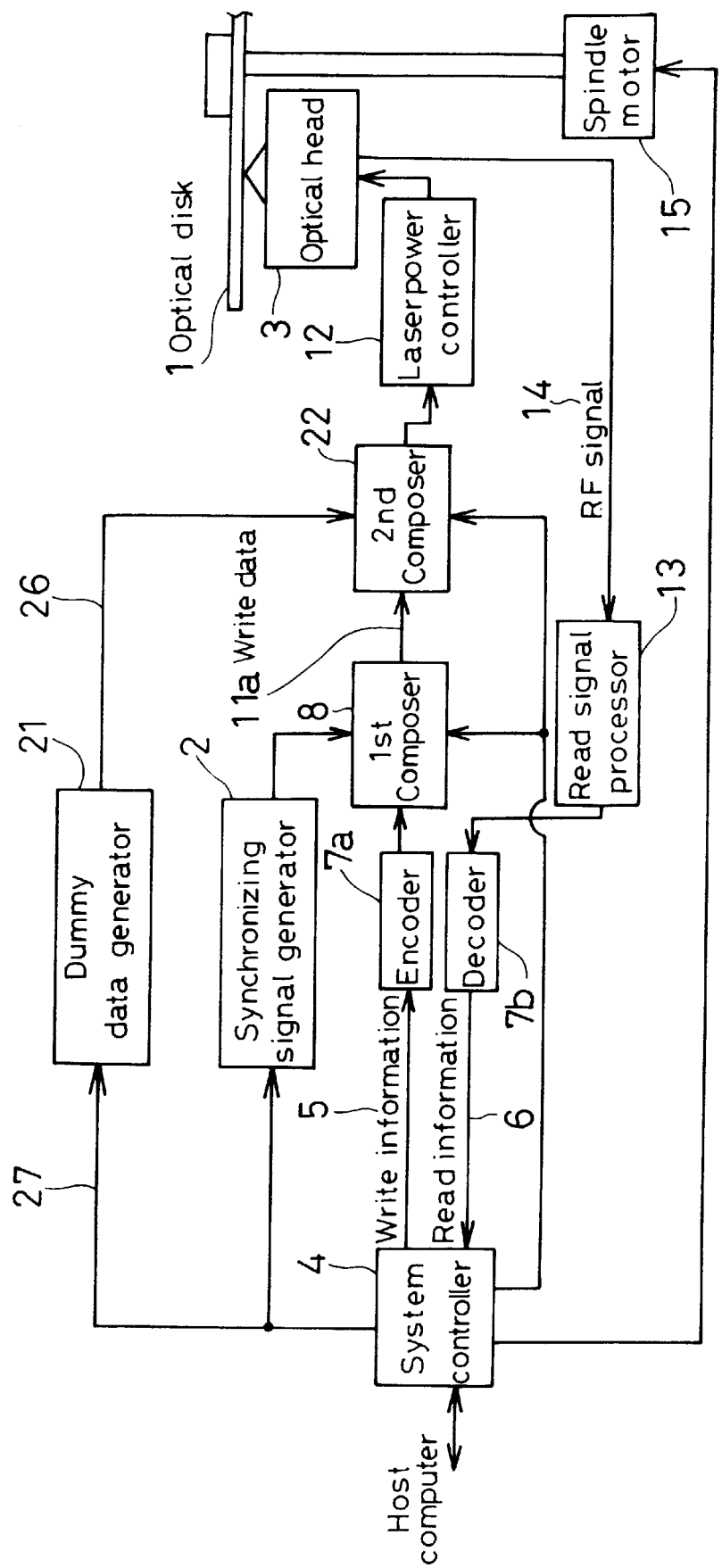
FIG. 4 is a block diagram illustrating the optical disk drive of a second embodiment according to the present invention.
Figure 5:
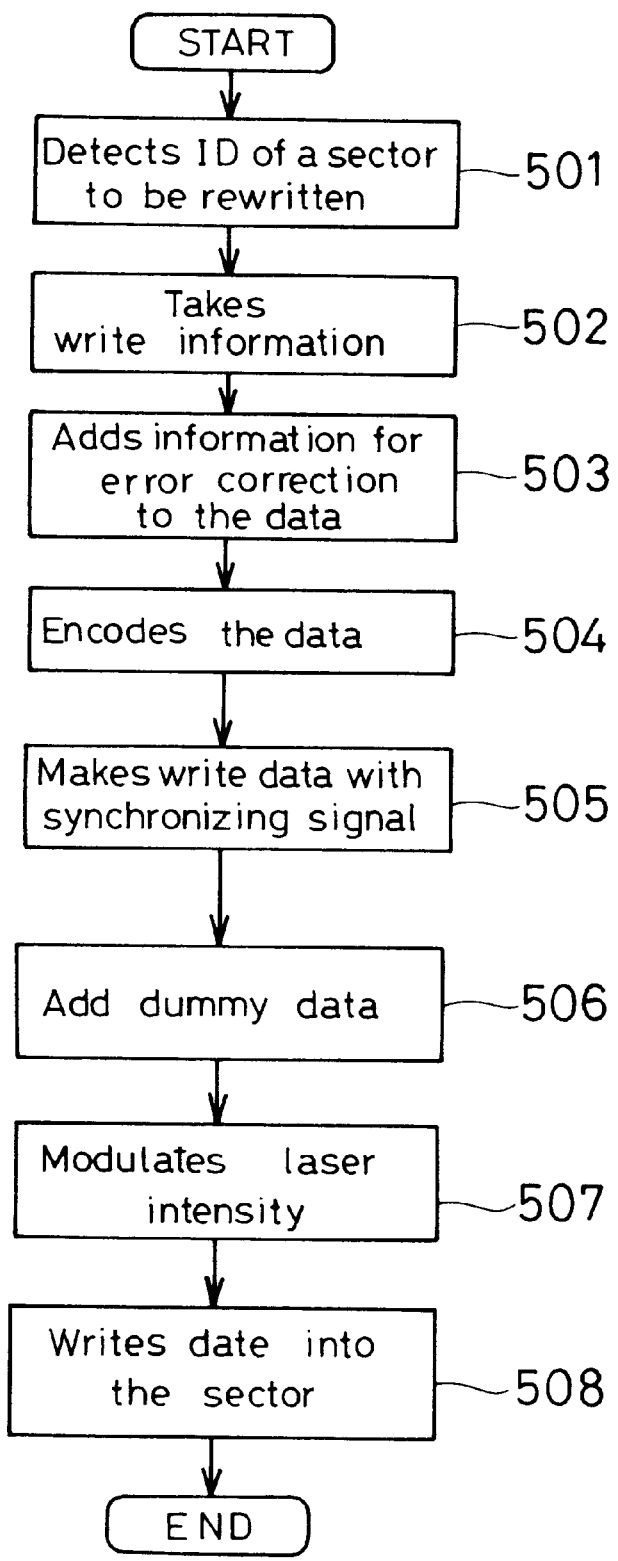
FIG. 5 is a flow chart of the operation performed by the optical disk drive illustrated in FIG. 4 for rewriting a sector of the optical disk.

FIG. 4 illustrates a block diagram of a reader/writer as the second embodiment of the present invention. A flow chart of the process to rewrite a sector performed by this reader/writer is illustrated in FIG. 5. After detecting ID (address data) of the sector to be rewritten in step 501, a system controller 4 that is connected to a host computer outputs write information 5 in the form of binary data (step 502). This write information 5 is provided with an information for error correction in step 503 and it is encoded in step 504. In step 505, each data block to be written in a sector is provided with a synchronizing signal (VFO) and other signals, so that write data 11a are made in a composer 8. Laser intensity is modulated according to this write data (step 507). The laser beam is focused on the optical disk, and thus the data are written into the sector of the optical disk. The above operation of this reader/writer is similar to the prior art; the following operation is different.

Figure 6:
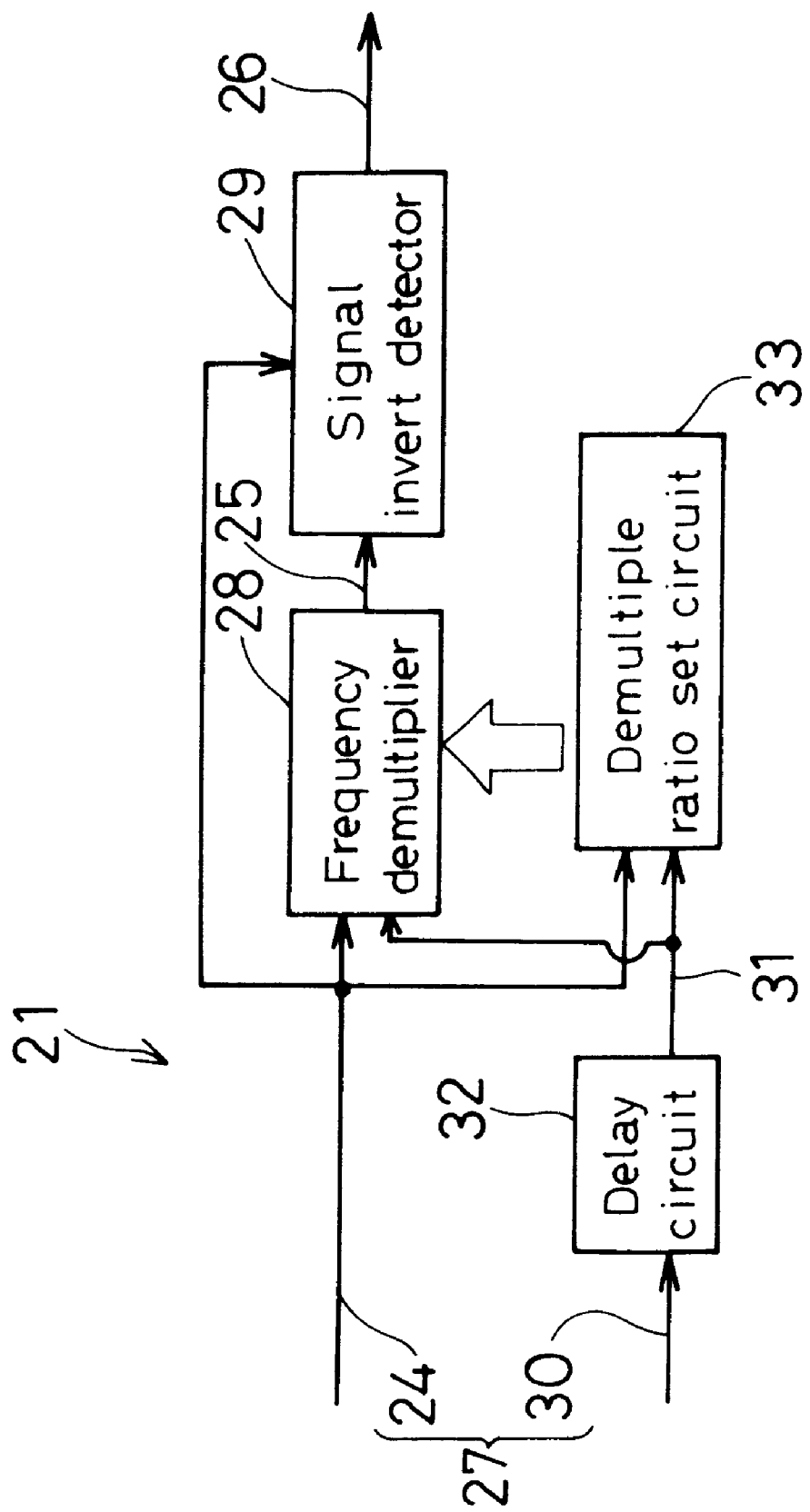
FIG. 6 is a block diagram of the dummy data generator of the optical disk drive illustrated in FIG. 4.
Figure 7:
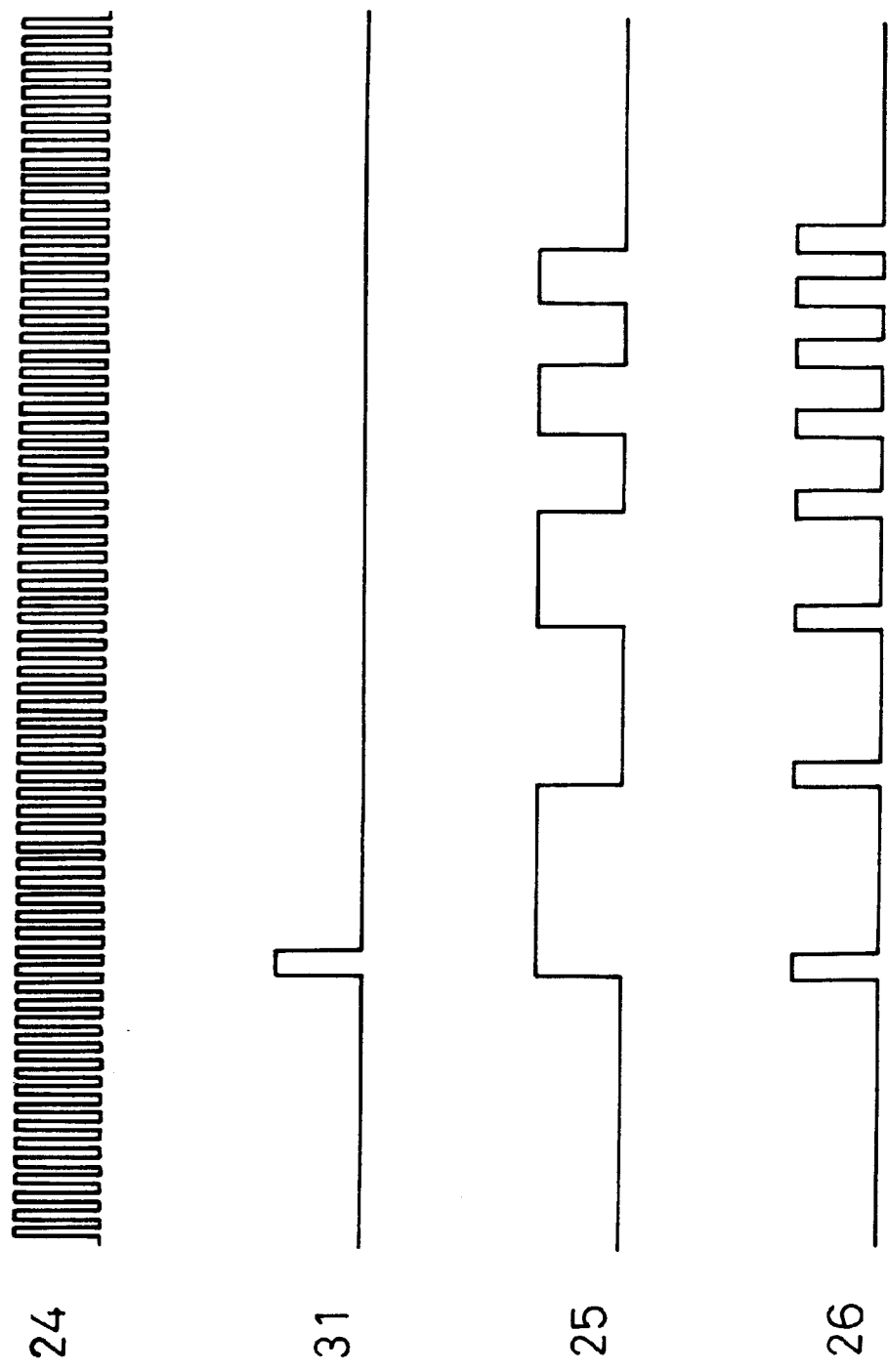
FIG. 7 is a timing chart of each signal of the dummy data generator illustrated in FIG. 6.

A dummy data generator 21 generates dummy data that is added to the head to the writing data and a second composer 22 composes the write data and the dummy data (step 506). The composed data are given to a laser power controller. Dummy data means data that are added to the original write data, including the synchronizing signal. An example of the configuration of the dummy data generator 21 is illustrated in FIG. 6. Wave forms of signals in the circuit illustrated in FIG. 6 are shown in FIG. 7.

Dummy data generating signals 27 from a system controller 4 are given to the dummy data generator 21. These signals 27 include a clock signal 24 that corresponds to the narrowest pulse width and an address information detecting signal 30. The clock signal 24 is inputted to a frequency demultiplier 28, a demultiple ratio set circuit 33 and a delay circuit 32. The proper delay time for adding dummy data to the head of the write data is set in the delay circuit 32. When an output signal 31 of the delay circuit 32 is added to the frequency demultiplier 28 and the demultiple ratio set circuit 33, demultiplying of the clock signal 24 starts.

The demultiple ratio set circuit 33 provide the frequency demultiplier 28. with a demultiple ratio setting signal that decreases the demultiple ratio slowly. Thus, the frequency demultiplier 28 outputs the pulse signal 25, whose period decreases slowly as shown in FIG. 7. This pulse signal 25 is given to an invert signal detector 29 that generates a pulse signal whose pulse width corresponds to several clock signals when the pulse signal is inverted. This pulse signal becomes dummy data 26.

Figure 8:
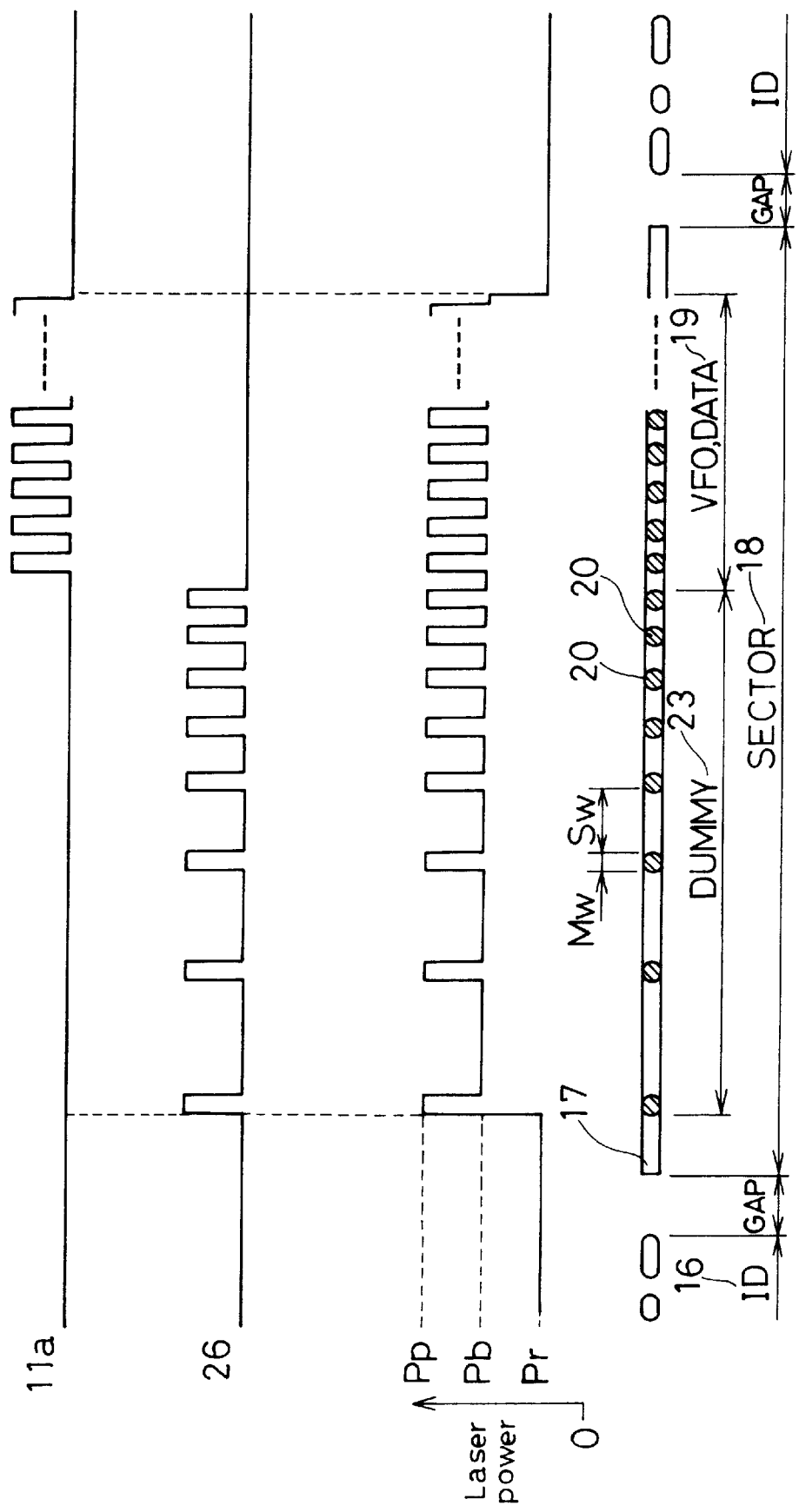
FIG. 8 is a timing chart for the write data, the laser power and the written state of the optical disk in the optical disk drive illustrated in FIG. 4.
Figure 9:
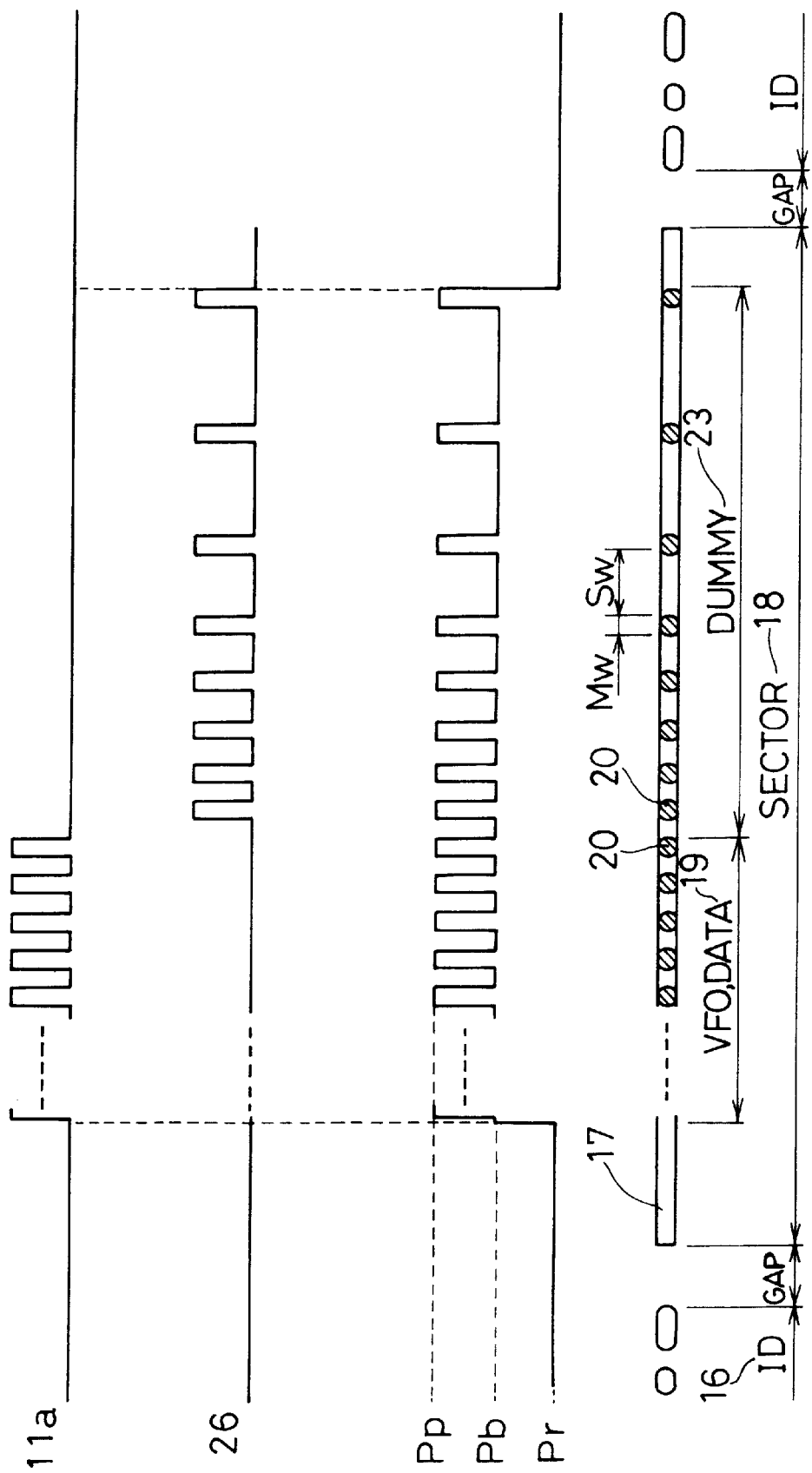
FIG. 9 is a timing chart for the write data, the laser power and the written state of the optical disk in a variety of the optical disk drive illustrated in FIG. 4.

FIG. 8 shows an example of a time chart that includes write data, laser power and written state by this reader/writer. As known from FIG. 8, the ratio of the pulse interval and the pulse width, i.e., the ratio of a mark distance (for spacing) Sw and a mark length Mw, is larger at the position closer to the head of the dummy data.

Therefore thermal stress is smaller in a portion closer to the head of the dummy data, so that material migration of the photo-sensitive layer is smaller in the portion closer to the head of the dummy data. Consequently, this avoids the damage of the photo-sensitive layer concentrating at a start point of the written data, and the deterioration of the photo-sensitive layer occurring due to repeated rewriting.

A concrete example will be explained below. The optical disk, modulation system and laser power are the same as in the before mentioned example. A random signal was used as the write information. The write data with the dummy data as shown in FIG. 8 were rewritten thirty thousand, fifty thousand, seventy thousand and a hundred thousand times. Then, the length of the deterioration area whose read signal is distorted in the head of the write data including the dummy data was measured. The length. of the dummy data is 50 $\mu$m on the disk. The ratio of the mark distance Sw and the mark length Mw was set larger in the portion closer to the head of the dummy data.

Table 2 shows a comparison of the length of deterioration area measured in this example (example 2), in another example that will be explained later, and in the prior art.

TABLE 2

| | Length of the deterioration area ($\mu$m) | | | |
|---|---|---|---|---|
| Times of rewriting | 30,000 | 50,000 | 70,000 | 100,000 |
| Prior art | 5 | 10 | 55 | 105 |
| Example 2 | 0 | 5 | 10 | 50 |
| Other example | 0 | 0 | 10 | 30 |

As seen in Table 2, the length of the deterioration area in this example is shorter than in the prior art. This means that deterioration of the photo-sensitive layer due to repeated rewriting is suppressed in this embodiment of the invention.

In this embodiment, dummy data are added to the head of the write data corresponding to the case in which deterioration of the photo-sensitive layer tends to occur in the head portion of a sector. However, it is also possible that the deterioration tends to occur in the tail portion of the sector due to the layer construction of the optical disk. In this case, the deterioration is suppressed by adding dummy data to the end of the write data, and by setting the ratio of the mark distance Sw and the mark length Mw larger in the portion closer to the end of the dummy data.

The dummy data in these embodiments have a constant mark distance Sw and a variable mark length Mw. However, it is possible to fix the mark length Mw and alternate the mark distance Sw. Any other pattern such as random signal pattern or DC signal pattern can be used as long as it can soften the sudden change in thermal stress to the photo-sensitive layer at the start or the end point of writing.

Figure 10:
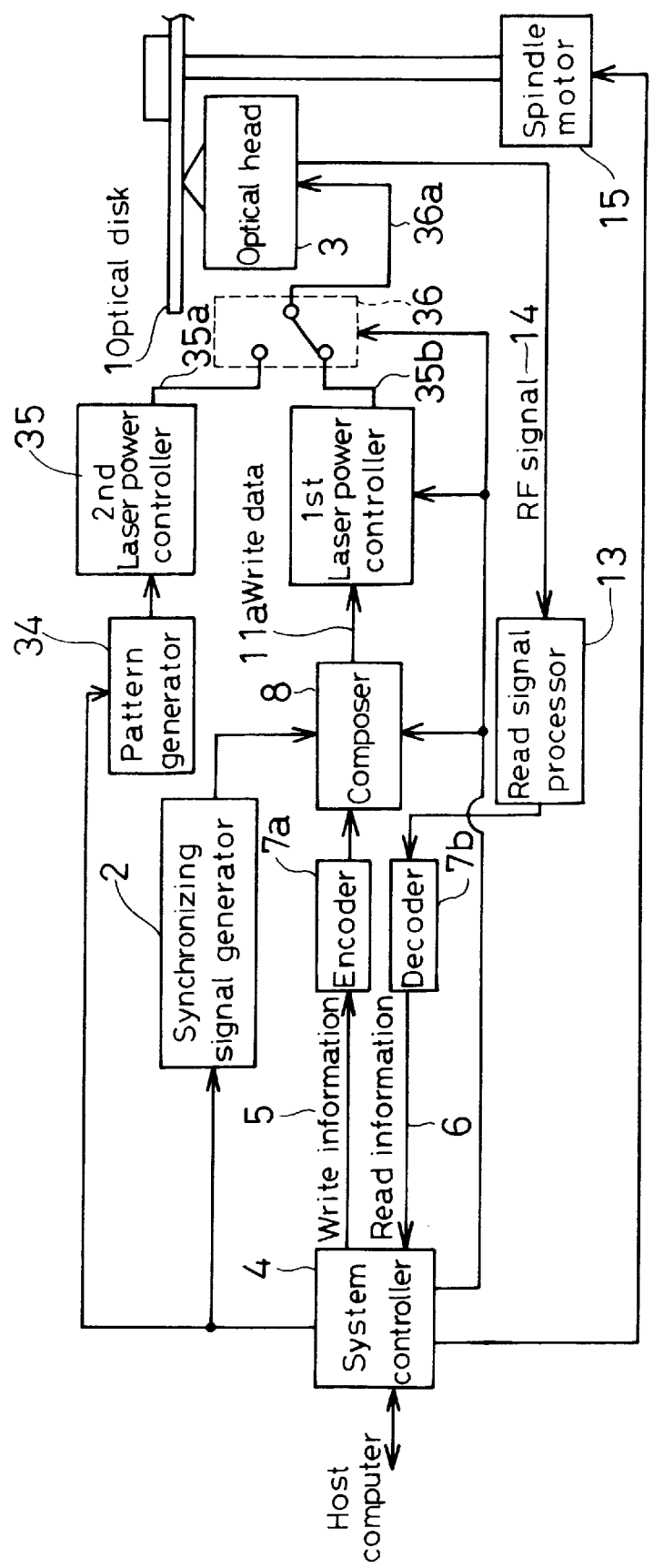
FIG. 10 is a block diagram illustrating a variation of the optical disk drive illustrated in FIG. 4.
Figure 11:
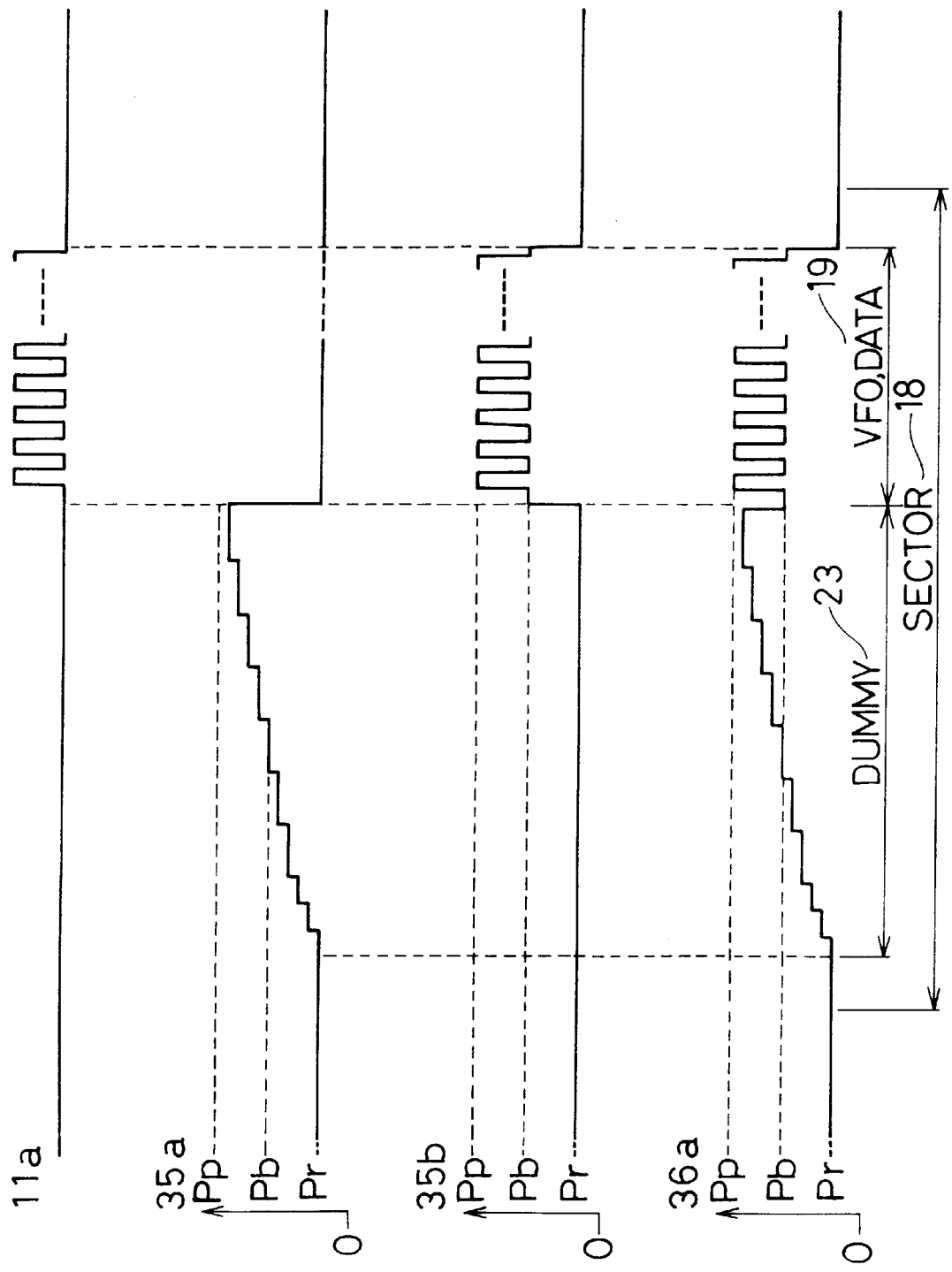
FIG. 11 is a timing chart for the write data and the laser power of the optical disk in the optical disk drive illustrated in FIG. 10.
Figure 12:
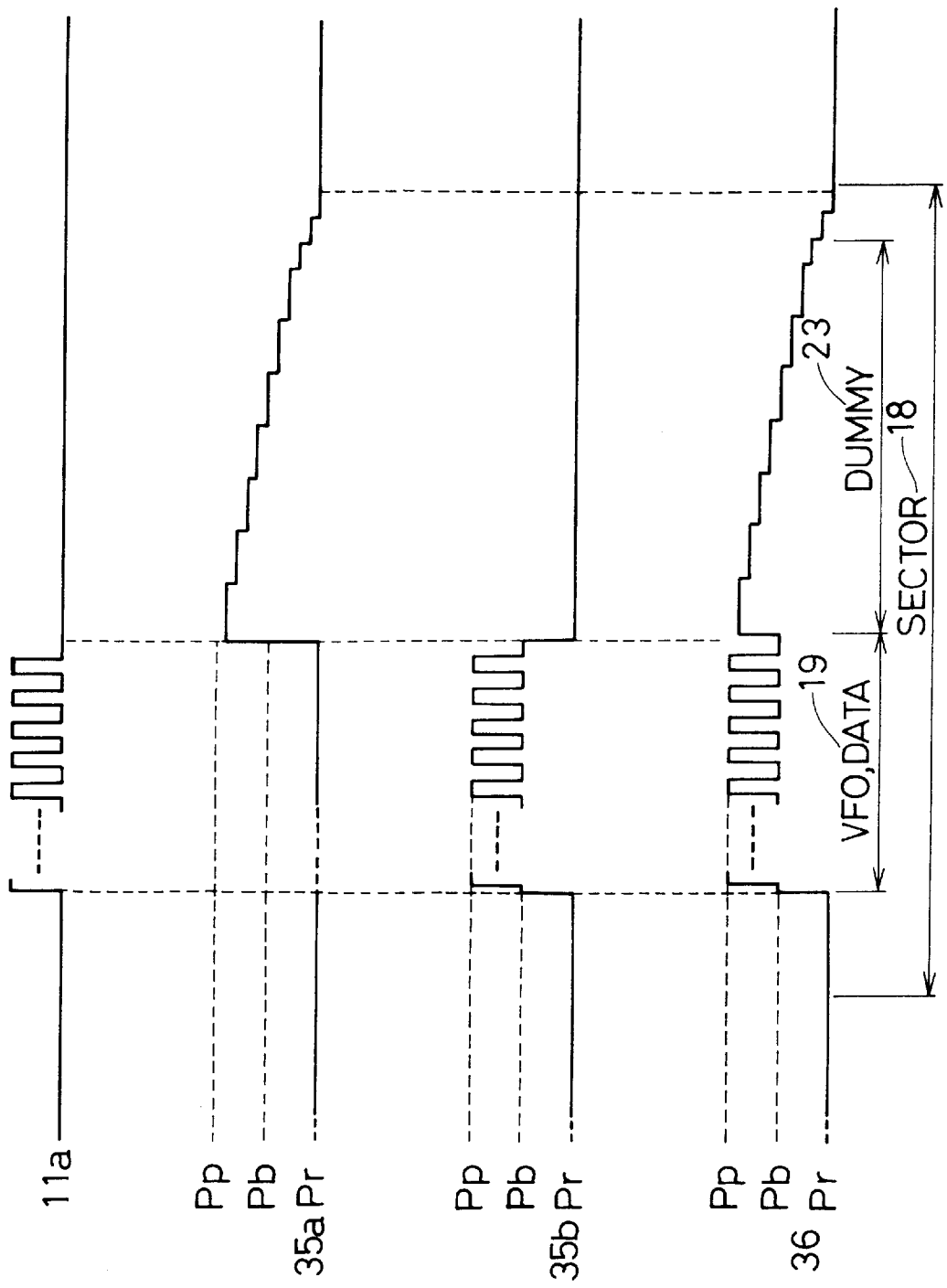
FIG. 12 is another variation of the timing chart for the write data and the laser power of the optical disk in the optical disk drive illustrated in FIG. 10.

A configuration illustrated in FIG. 10 is preferable. This configuration does not include the dummy data generator 21 and the second composer 22 illustrated in FIG. 4, but includes a pattern generator 34 that increases or decreases the intensity of the laser power step by step, a second laser power controller 35 and a selector 36 for switching the first and second laser power controller. As shown in FIGS. 11 or 12, the laser intensity is increased or decreased slowly in the dummy portion connected to the head or the tail of the write data portion, and the selector 36 is switched, so that the modulated laser intensity waveform 36a is gained. This laser intensity waveform 36a can be used to perform the same effect as the above mentioned embodiment where the start point of writing in a sector is altered at random.

It is also preferable to combine this embodiment and the above mentioned embodiment. This result is showed in Table 2 as the "other example". It can be seen that the deterioration of the photo-sensitive layer is suppressed more effectively in the other example by decreasing the thermal stress in the head of the dummy data more smoothly.

The length of the dummy data string can be altered at random in every rewriting to get the same effect as altering the start point of writing at random.

In this embodiment, the mark distance as well as the mark length in the end of the dummy data is set identically as in the synchronizing signal portion for preventing the rapid change in thermal stress between the dummy data and the synchronizing signal portion, so as to suppress the deterioration of the photo-sensitive layer from the head of the synchronizing signal portion.

Figure 13:
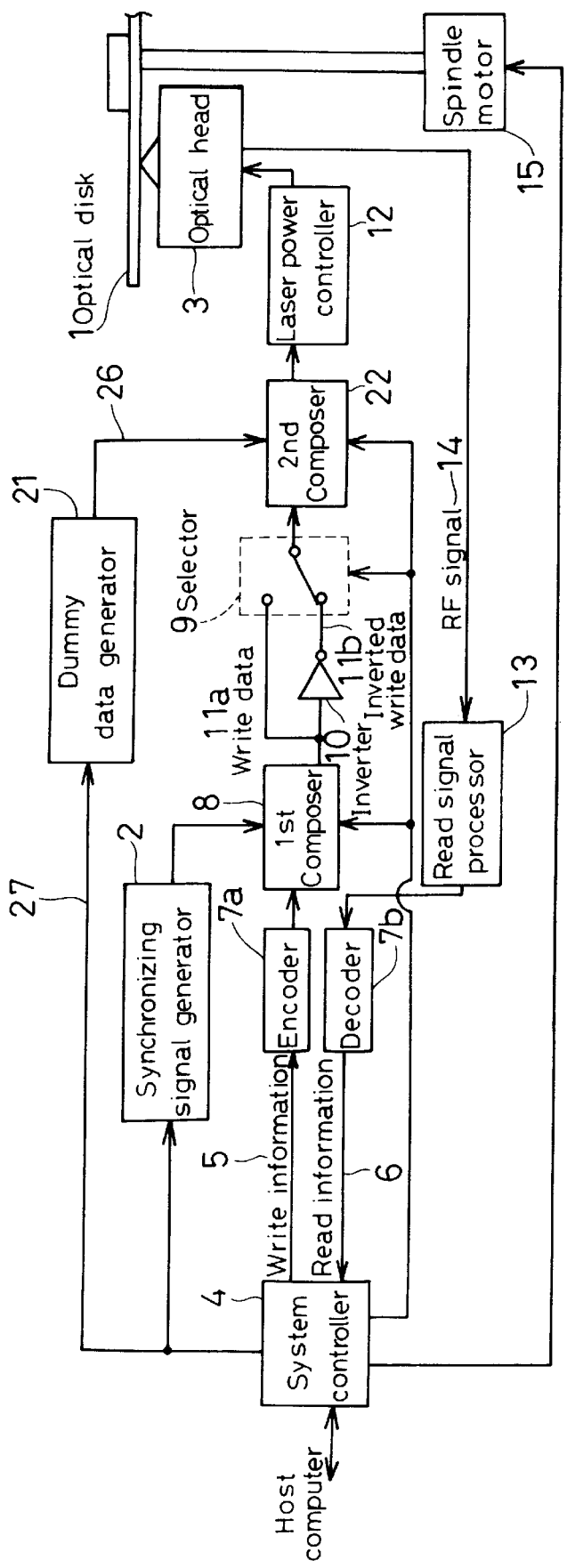
FIG. 13 is a block diagram illustrating another variation of the optical disk drive illustrated in FIG. 4.
Figure 14:
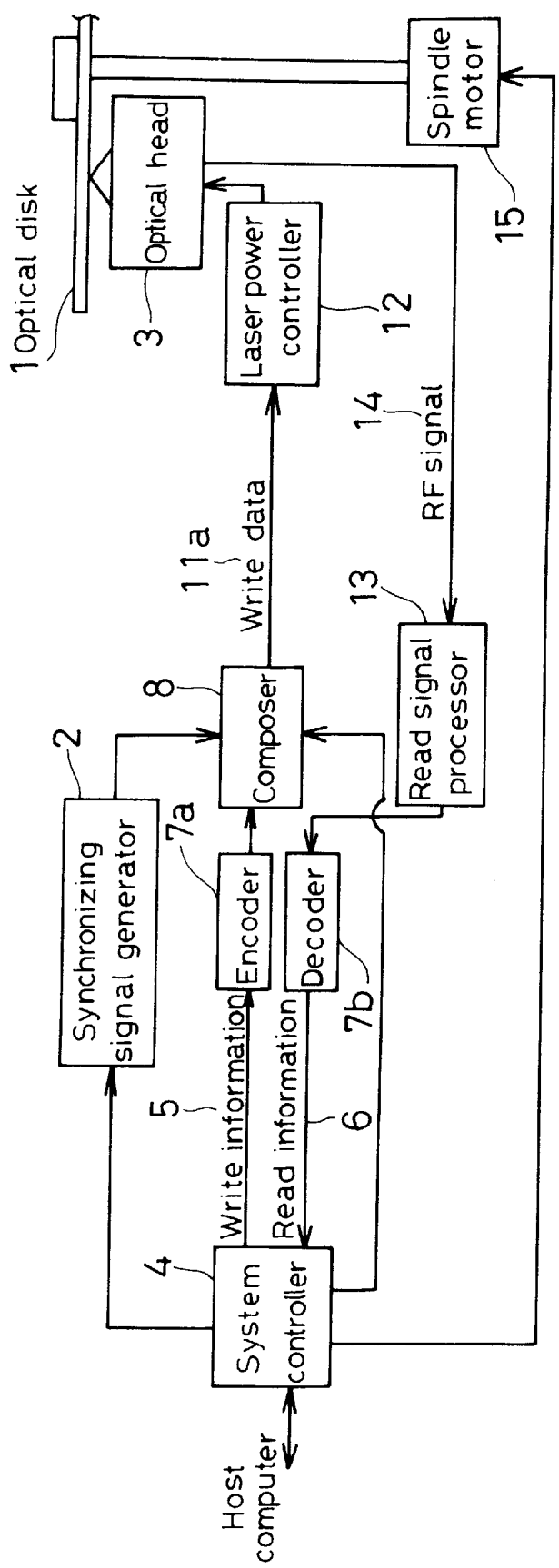
FIG. 14 is a block diagram illustrating an optical disk drive of the prior art.
Figure 15:
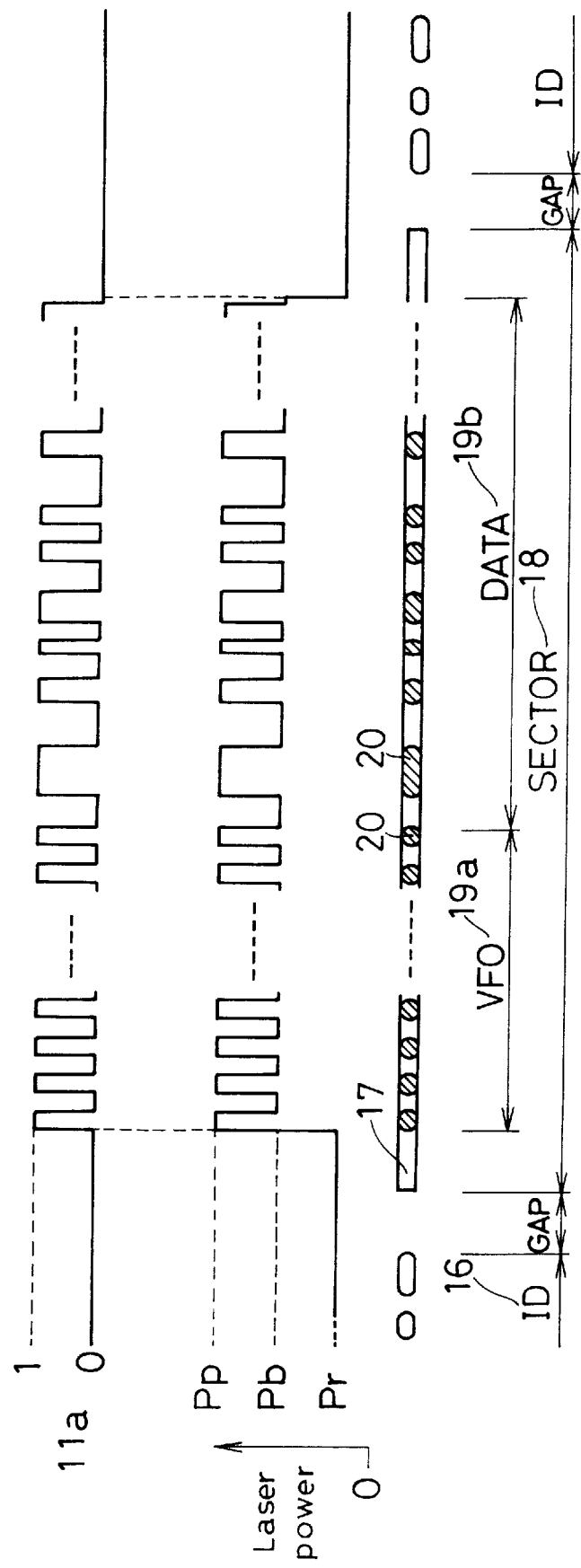
FIG. 15 is a timing chart for the write data, the laser power and the written state of the optical disk in the optical disk drive illustrated in FIG. 14.

It is more preferable to combine the method of adding the dummy data to the head of the write data as in this embodiment and the method of inverting the write data at random mentioned in the first embodiment. This configuration, illustrated in FIG. 13, suppresses the deterioration of the photo-sensitive layer at the head or the end of the write data as well as in the write data, so that the optical disk has a longer life.

Third Embodiment

Figure 16:
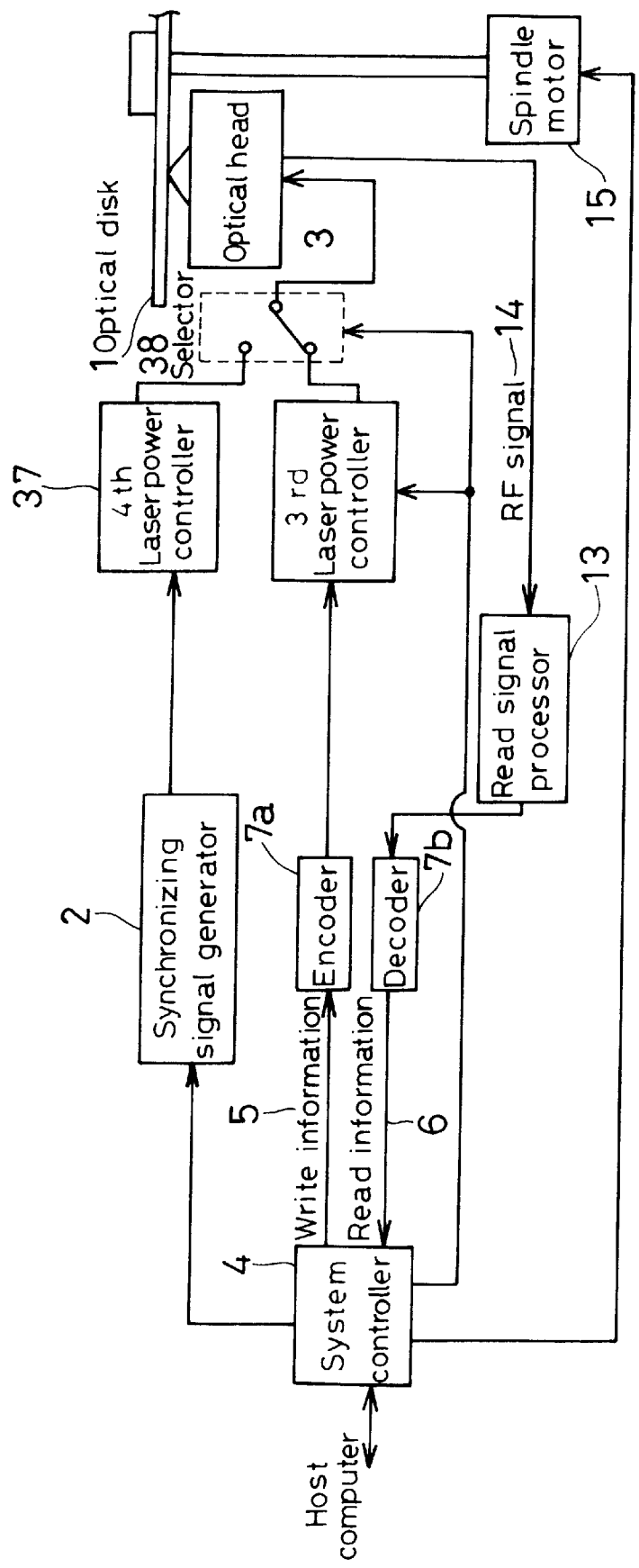
FIG. 16 is a block diagram illustrating the optical disk drive of a third embodiment according to the present invention.
Figure 17:
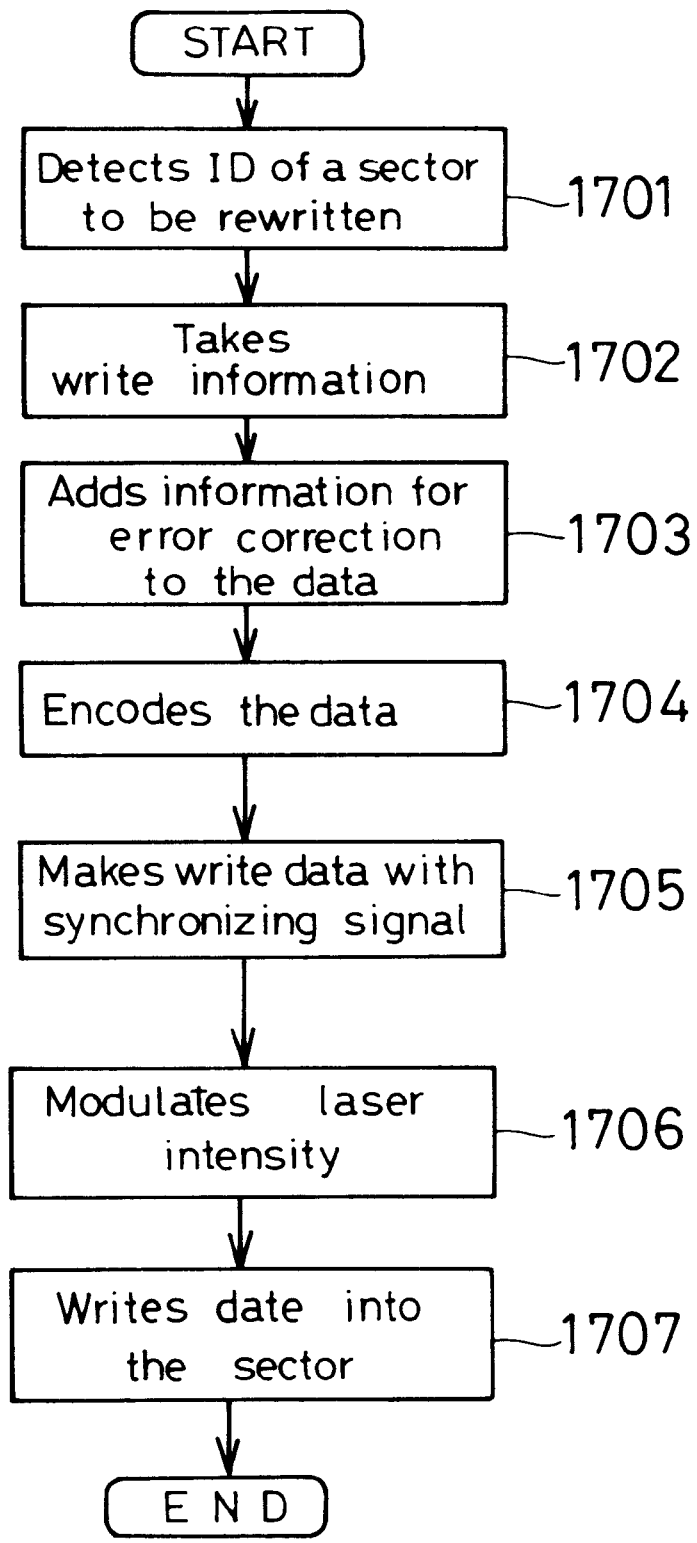
FIG. 17 is a flow chart of the operation performed by the optical disk drive illustrated in FIG. 16 for rewriting a sector of the optical disk.

A block diagram of a reader/writer as a third embodiment of the invention is illustrated in FIG. 16. A flow chart of the process to rewrite a sector performed by this reader/writer is illustrated in FIG. 17. After detecting ID (address data) of the sector to be rewritten in step 1701, a system controller 4 that is connected to a host computer outputs write information 5 in form of binary data (step 1702). This write information 5 is provided with information for error correction in step 1703 and it is encoded in step 1704. On the other hand, each data block to be written in a sector. is provided with a synchronizing signal (VFO) from synchronizing signal generator 2 and laser intensity is modulated (step 1705). The laser power controller is switched by selector 38. Then, the laser beam is focused on the optical disk 1 to write the data into the sector of the optical disk. The different point of above operation from that of the prior art is that the laser power (energy) for writing the synchronous signal is not same as the power for writing decoded write data following the VFO.

Figure 18:
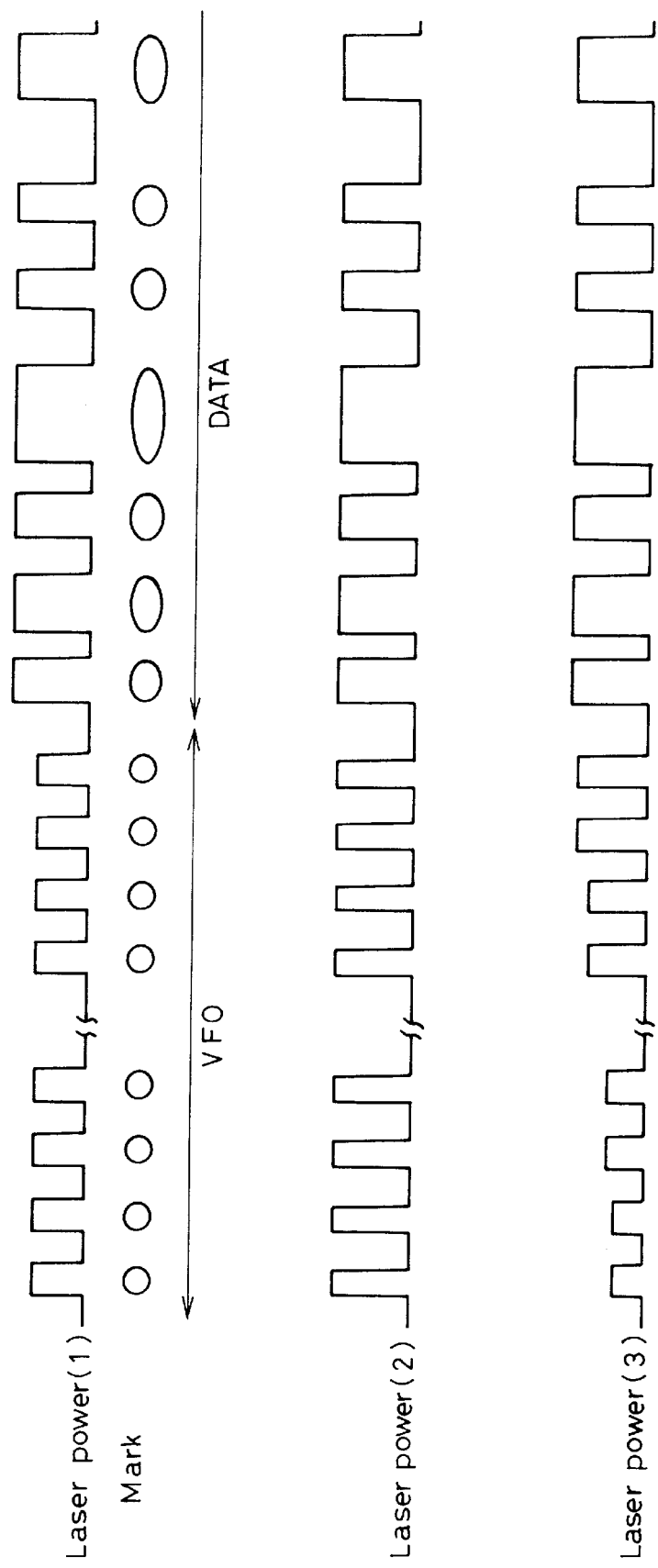
FIG. 18 is a timing chart showing variation in the laser power when writing a mark train including the synchronizing signal and the data with the optical disk drive illustrated in FIG. 16.

FIG. 18 shows a timing chart of laser power and written mark where the VFO and the write data are written in the data portion of the same sector. As shown in the laser power (1) in FIG. 18, the data following the VFO are written with pulse width modulation and the laser power for writing the VFO is set lower than that for writing the data. Such writing method can suppress the deterioration in VFO due to repeated rewriting since the thermal stress is smaller in the VFO portion than in the data portion.

One of the other writing methods is shown in the laser power (2) in FIG. 18. In this method, both VFO and the write data are written with pulse width modulation, and the pulse interval is longer than the pulse width in the VFO signal portion (at least in the leading part of the VFO portion). Thus, also by this method, the deterioration in VFO due to repeated rewriting is suppressed, since the thermal stress is smaller in the VFO portion than in the data portion.

The laser power (3) in FIG. 18 shows another writing method, where the laser power for writing the VFO is set lower at the beginning than that for writing the data, but it becomes higher step by step up to the power for writing the data. The deterioration in VFO due to repeated rewriting is suppressed for the reason mentioned above also in this method. Since the mark length is varied according to the laser power in this method, the read signal (reproduced waveform) of VFO may not be recognized as a clock with a constant frequency. To solve this problem, VFO is written such that the centers of the marks have a constant pitch and only the centers of the marks are detected when reading the VFO. Alternately, head or tail edge of marks can have a constant pitch and only the head or the tail edge of the marks are detected when reading the VFO.

It is preferable to combine the above writing methods and the method disclosed in Japanese Patent Application No. 2-94113 where the relative position of the starting points of writing VFO and data on a optical disk is varied at every writing time.

It is also preferable to write dummy data following the write data. The length of the dummy data may be altered according to how often the disk is rewritten. If the disk is supposed to be rewritten many times, dummy data with enough length are necessary. On the other hand, if the disk is rarely rewritten, dummy data may not be necessary.

A concrete example will be explained below. A disk was rotated at a linear speed of ten meters per second at the write portion to write a signal. The disk was made by forming a photo-sensitive layer of $Ge_2Te_2Sb_5$ for writing, protecting layers of ZnS and a reflecting layer of aluminum on the substrate of polycarbonate having grooves for tracking. Data was written with pulse width modulation by 2–7 RLL (Run Length Limited) code and EFM (Eight to Fourteen Modulation). The shortest mark length and the shortest mark distance were set at 0.8 $\mu$m. A Reed-Solomon code was used for error correction. A length of VFO area was set at 50 $\mu$m. Writing data into the disk was performed by modulating the laser power between writing power and erasing power according to the data. Power levels for writing, erasing and reading were set at 13 mW, 6 mW and 1 mW respectively. No read error occurred in the center of the data area under above laser power condition. The laser power for writing VFO was altered according to necessities. The laser power for writing VFO marks was adjusted by rewriting data stored in the synchronizing signal generator.

The deterioration due to repeated rewriting at the head of the VFO was suppressed by lowering the laser power for writing VFO marks, under the condition of the same laser power for writing data and of the same mark period in the VFO area. To lower the laser power, three methods were checked. The first method was to lower the peak level of the laser power; the second method was to shorten the irradiation time; and the third method was a combination of the first and second methods. Any of these methods was effective in suppressing the deterioration.

Table 3 shows an example of the laser power for writing VFO mark and the length of the read signal waveform deterioration area at the head of VFO after rewriting 500 thousand times. The VFO marks were written with a mark distance of 1.6 $\mu$m and a duty factor of 50% (corresponding to the shortest mark length in data writing). Pulse width modulation by 2–7 RLL code was used. The length of the waveform deterioration area was defined as the length of the area where the data could not be read correctly. The duty period of the laser power for writing VFO marks was set identically with the laser power for writing the shortest mark of write data.

TABLE 3

| Laser power for writing VFO marks | Length of the deterioration area at VFO head portion | PLL draw in by VFO |
|---|---|---|
| 13 mW | 40 $\mu$m | failure |
| 12 | 33 | success |
| 11 | 5 | success |
| 10 | 50 | failure |

It is clear from Table 3 that the length of the deterioration area at the VFO head portion become short if the laser power for writing VFO marks is decreased. Therefore, decreasing the laser power results in good reading of VFO, though too much decreasing makes the amplitude of the read signal small and results in a failure to read.

Regarding the head of the mark train of data after VFO, there was seen a waveform distortion of approximately 10 $\mu$m. This distortion seems to be caused by rapid change of thermal stress between the VFO area and the data area because the average laser power in the former is smaller than that in the latter. It was confirmed that the distortion of the read signal at a border of the VFO and the data area can be suppressed by increasing the laser power for writing VFO marks slowly up to the average laser power for writing data.

Figure 19:
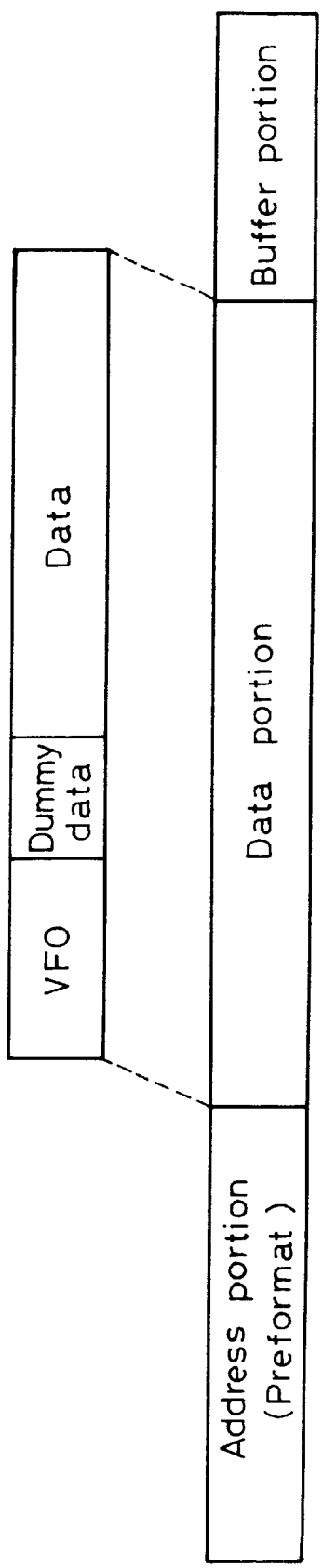
FIG. 19 is a chart showing a record format in a data portion of a sector when writing a mark train including the synchronizing signal and the data with the optical disk drive illustrated in FIG. 16.

If dummy data are added to the head of the data following VFO, the deterioration at the border of the VFO and the data area can be ignored, so that the deterioration of the read signal waveform due to repeated writing is eliminated. A writing format of data in a sector by this invention is illustrated in FIG. 19. There is no problem if the dummy data cannot be read partly due to repeated writing as long as the original data can be read. Heading information is written at the head of the original data. The length of the dummy data depends on how often the disk is used. The same modulation method can be used for the dummy data and the original data.

The allowable ratio of the mark distance and the mark length of VFO was investigated under the condition of the same modulation method and laser power for the VFO and the data mark. The result is that the length of the deteriorated waveform is shorter when the ratio (mark distance/length) is bigger than one as compared to when the ratio is one. As a result of further investigation, a better effect is gained when the ratio is more than 1.5, i.e. the length of the deterioration area became less than 60% of when the ratio is one. It also became clear that decreasing the ratio to one at the end of VFO is effective for lowering the distortion level of the read waveform at the boundary between the VFO and the data mark area. The influence of the deterioration at the boundary on the original data is avoided also in this configuration by writing dummy data at the head of the original data.

Fourth Embodiment

Figure 20:
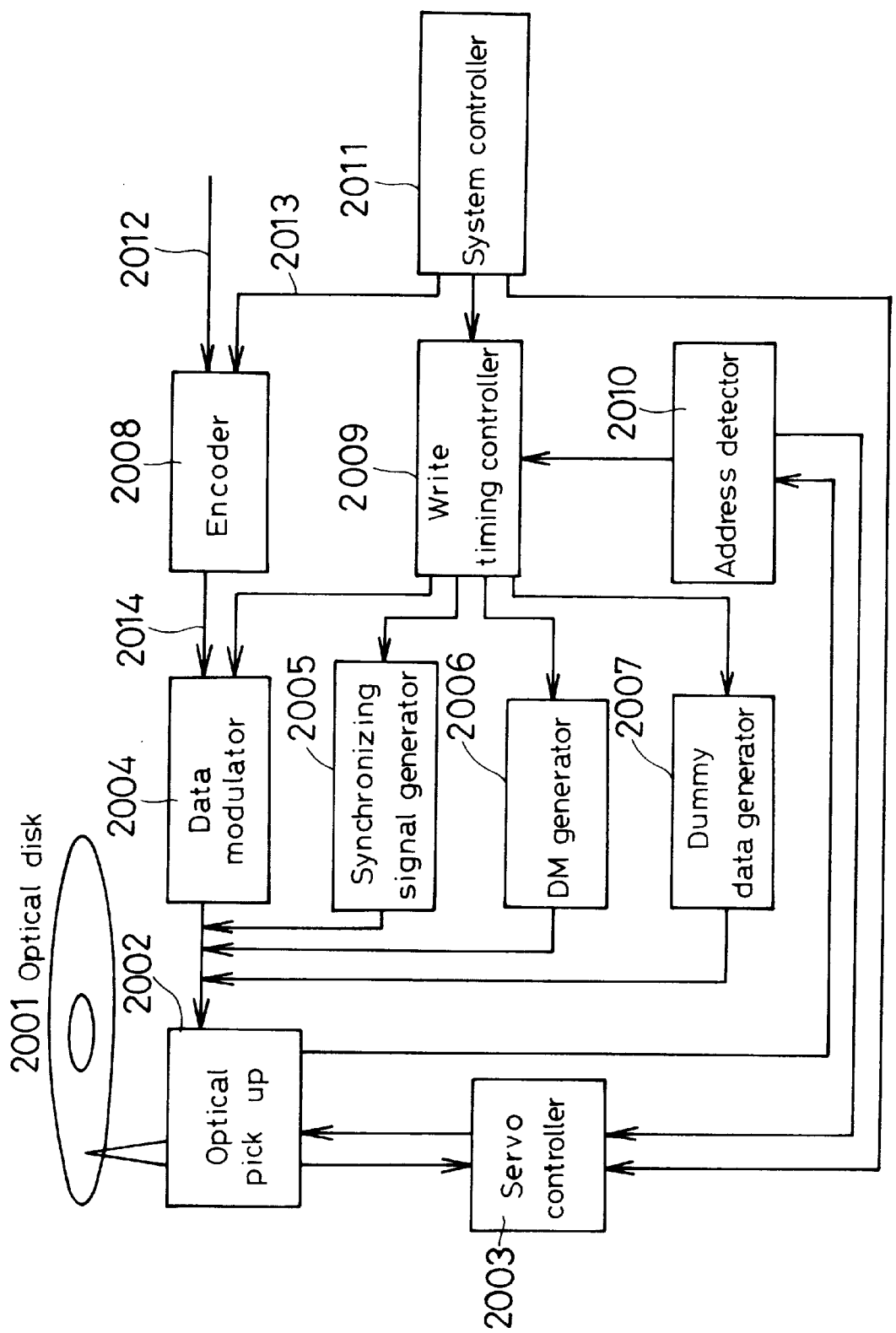
FIG. 20 is a block diagram illustrating the optical disk drive of a fourth embodiment according to the present invention.

A block diagram of a reader/writer as a fourth embodiment of the invention is illustrated in FIG. 20. A format of the writing sector of the optical disk is illustrated in FIG. 21.

In this figure, numeral 41 represents an ID that contains address information of the sector; 42 represents a synchronizing signal (VFO) for drawing in of PLL; 43 represents a data head indicating mark DM; 44 represents a data block encoded with an error detection code; 45 represents a dummy block DMY written after the data block 44. There are gaps 47 and 48 between the ID areas and the data writing area 46 where the data represent written, read or erased. The gaps are needed for dealing with a rotation fluctuation. The dummy block DMY can be eliminated if the necessity of frequent rewriting is low. In the first to third embodiments, the data head indicating mark DM is included in the original data.

In FIG. 20, numeral 2001 represents an optical disk; 2002 represents an optical pick-up that follows a guide track of the optical disk 2001 to irradiate a laser beam on the recording surface for writing, reading and erasing; 2003 represents a servo controller that controls a position of the optical pick-up to focus the laser beam at the desired point on the optical disk; 2004 represents a data modulator that modulates the write data to a suitable form for recording; 2005 represents a synchronizing signal generator that generates the synchronizing signal (VFO) for drawing in of a PLL; 2006 represents a DM generator that generates the data head indicating mark DM; 2007 represents a dummy data generator; 2008 represents a encoder that encodes the data with error detection code; 2009 represents a write timing controller; 2010 represents an address detector that detects a target address from a sector ID 21; 2011 represents a system controller that controls the whole system with a microprocessor.

The above configured optical disk reader/writer operates as follows. The system controller gives the address of the target sector to be written to the servo controller 2003. The servo controller 2003 compares the target address with an address from the address detector so as to control the position of the optical pick-up. The system controller 2011 gives an encode instruction 2013 to the encoder 2013 as well as a write instruction to the write timing controller.

The encoder 2008 encodes the data 2012 with an error detection code according to the encode instruction 2013, and gives the encoded data 2014 to the data modulator 2004 that modulates the encoded data 2014.

The write timing controller 2009 is triggered by the write instruction from the system controller 2011. It gives triggering instructions to the synchronizing signal generator 2005, the DM generator 2006, the data modulator 2004 and the dummy data generator 2007 in turn after the address detector 2010 detects the target address. The data are thus written into the recording area 46 of the sector. In the above series of operations, the synchronizing signal generator 2005 generates the synchronizing signal and the dummy data generator 2007 generates the dummy data. The dummy data generator 2007 can be eliminated if the necessity of frequent rewriting is low.

Figure 22:
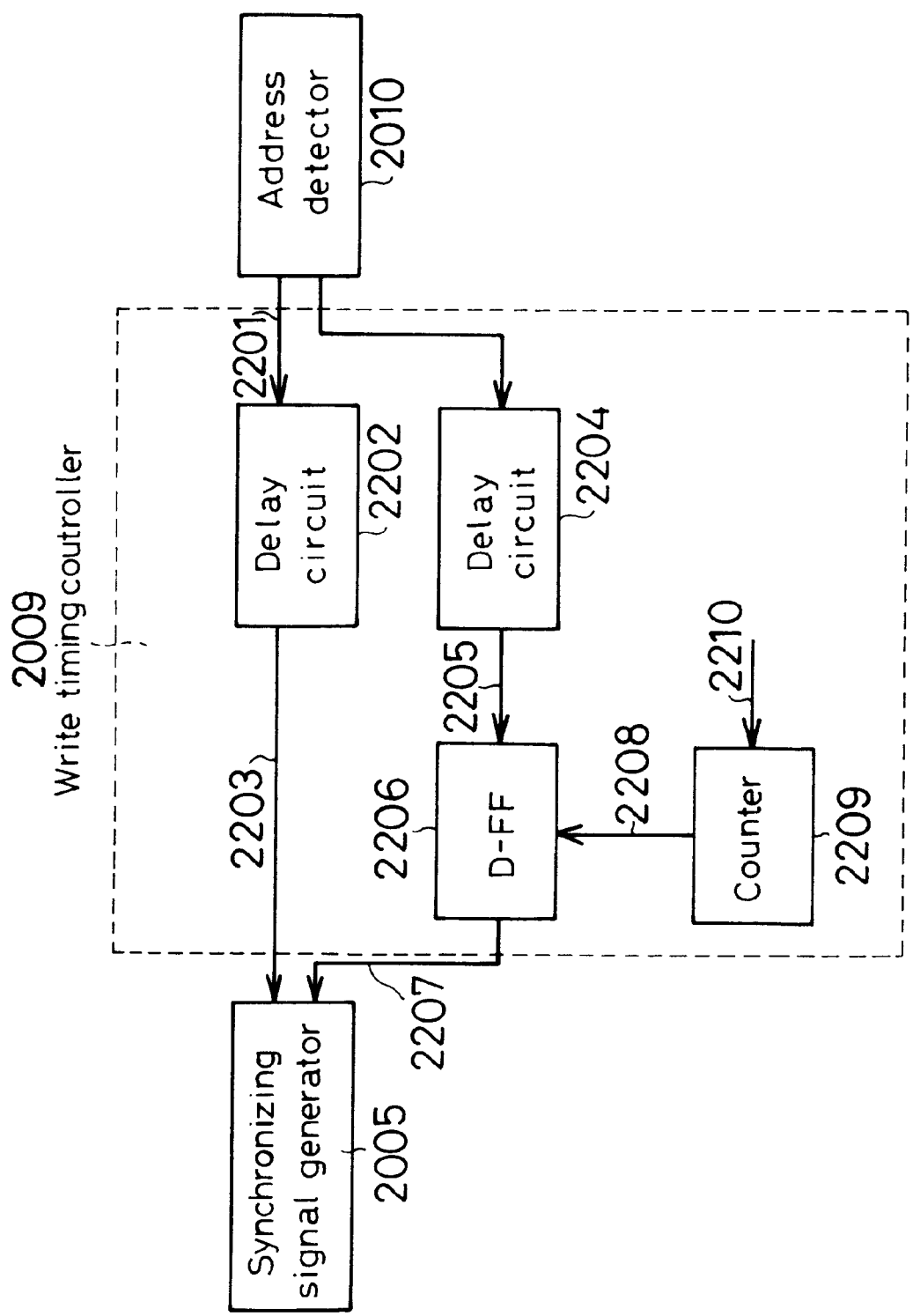
FIG. 22 is a block diagram of the write timing controller of the optical disk drive illustrated in FIG. 20.
Figure 23:
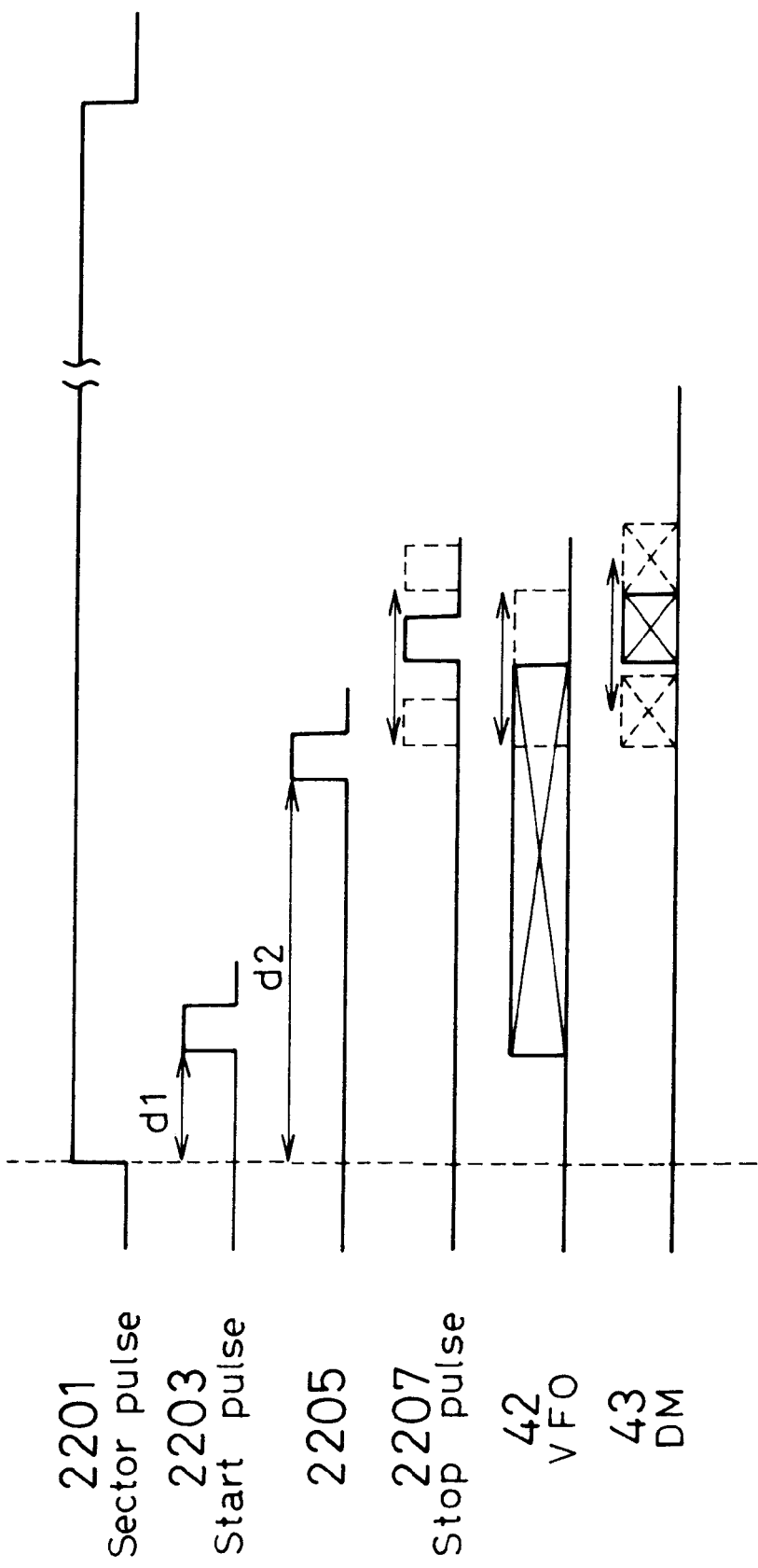
FIG. 23 is a timing chart showing the operation of the write timing controller illustrated in FIG. 22.

FIG. 22 illustrates a part of the write timing controller 2009. This part gives the trigger instruction to the synchronizing generator 2005. A timing chart of the operation is shown in FIG. 23.

A sector pulse 2201 that indicates the sector is withdrawn from the address signal that the address circuit 2010 has obtained. This sector pulse 2201 is sent to the delay circuit 2202 to be a start pulse 2203 with predetermined delay time d1. The start pulse 2203 is sent to the synchronizing signal generator 2005 that generates the VFO. Identical delay times are provided for the identical sector to start writing the VFO from the identical place on the optical disk. On the other hand, the sector pulse 2201 is sent also to another delay circuit 2204, where the pulse is provided with a predetermined delay time d2 to be a start pulse 2205. The delay time d2 is larger than d1.

The counter 2209 demultiplies a clock input signal into a clock signal 2208 with a suitable period that is asynchronous with a data input pulse 2205. This clock signal 2208 is given to a D-type flip-flop (D-FF) 2206, which latches the pulse 2205 and outputs a stop pulse 2207 to the synchronizing signal generator 2005. A random delay time is added to the stop pulse 2207 due to the period of the clock signal 2208 that is asynchronous with a data input pulse 2205. Therefore the synchronizing signal generator 2005 alters the stop point of the synchronizing signal at random. The write timing controller 2009 gives the trigger instruction to the synchronizing signal generator 2006, then sends the trigger instruction to the DM generator 2006 synchronizing with the stop pulse 2207, and thus the data head indicating mark is recorded.

As explained above, this embodiment can alter the length of the VFO at random without changing the start point of VFO writing by providing the D-FF before the synchronizing signal generator when rewriting is performed repeatedly.

Figure 24:
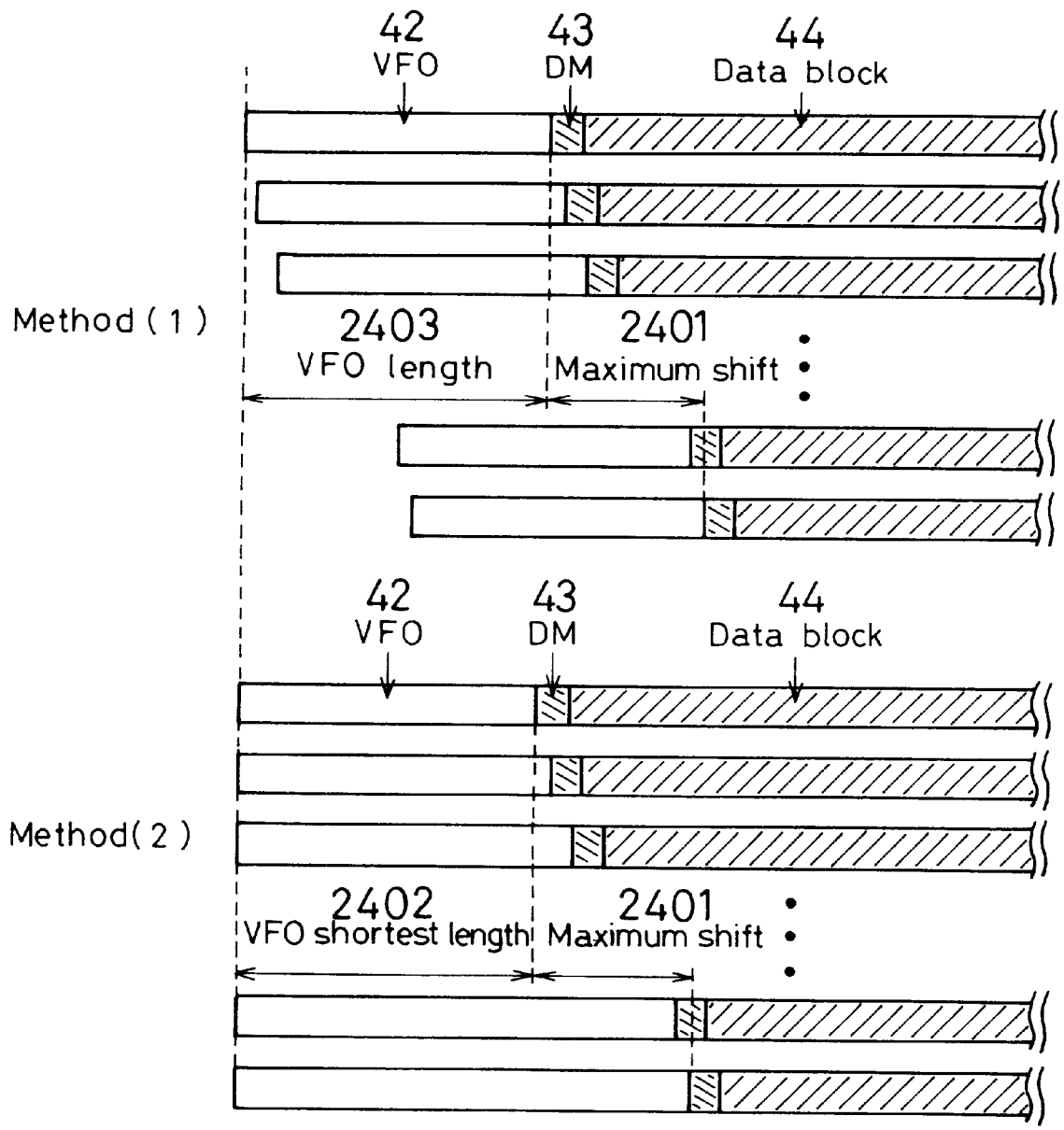
FIG. 24 is a chart showing a pattern of the synchronizing signal recorded by the optical disk drive illustrated in FIG. 20.

The suppression effect of the deterioration of the read waveform due to repeated rewriting in a sector will be explained below comparing between prior art and this embodiment. FIG. 24 shows the place where the VF0 is recorded in a sector. Method(1) is a method of the prior art where the start point of VFO writing is altered at random; Method(2) is a method of this embodiment where the length of VFO is altered at random without changing the start point of VFO writing. In FIG. 24, the end position of the VFO 42 is altered from the nearest to the farthest in order, but actually, it is altered at random. The maximum position shift 2401 in Method(1) is identical with that in Method(2).

The VFO shortest length 2402 of the Method(2) in FIG. 24 is determined as below. The deterioration of the read waveform due to the repeated rewriting exists from the start point of VFO writing. The deterioration progresses in the direction that the laser beam is moved according to the increasing number of rewrite times. Therefore, the VFO shortest length 2402 is set such that at least the end of VFO can be read after the expected maximum times of rewriting have been performed and drawing in of the PLL can be done correctly.

There is no difference between Method(1) of the prior art and Method(2) of this embodiment concerning the range where the end point of the VFO 42 is altered at random if the VFO length 2403 in Method(1) is set identical with the VFO shortest length 2402 in Method(2). However, compared with Method(1) where the length of the VFO is fixed, Method(2) of this embodiment, where the length of VFO varies at random from the shortest length 2402 to the longest length that is sum of the shortest length 2402 and the maximum position shift 2401, has an advantage as described below. An average length of the VFO in Method(2) is longer than the fixed VFO length 2403 in Method(1) by the length that corresponds to a half of the maximum position shift 2401. On the other hand, the deterioration due to the repeated rewriting begins at the start point of writing., i.e. the start point of VFO. Therefore, it takes a longer time for the deterioration to reach the DM at the head of the data in Method(2) than in Method(1) because the average length of the VFO in Method(2) is longer than the fixed VFO length in Method(1). This means the maximum times of rewriting can increase (the life cycle is expanded).

From another view point, the effective memory capacity of the optical disk can be expanded in Method(2) of this embodiment versus Method(1) of the prior art for the identical number of rewriting times, since the length to be reserved for VFO can be shortened in Method(2). This invention can be applied if a certain data string followed by the VFO exists at the starting point of the recording area. There is a case, for example, where dummy data are written before the VFO. In this case, the above effect is obtained by arranging the start position of VFO writing and recording the VFO with its end point altered at random.

Fifth Embodiment

Next, a fifth embodiment will be explained. As mentioned above, by writing the data with the end point of the VFO altered at random, the data can be read correctly even if data in the same pattern are rewritten repeatedly in a sector. In this case, the end position of data writing alters on the optical disk at random even if the byte number of the data does not vary. The end position of data writing has a fixed distance from the end position of the VFO, i.e. the record position of the data head indication mark DM, if the rotation fluctuation of the optical disk is very small. Therefore, the end position of data writing on the optical disk alters at random according to the data head indicating mark DM. The reader/writer is provided with means for changing the the length of the dummy data according to the position of the data head indicating mark such that the length of the dummy data string is shortened as the DM shifts behind and lengthened as the DM shifts forward. It is desirable that the end position of the dummy data writing does not change on the optical disk.

Figure 25:
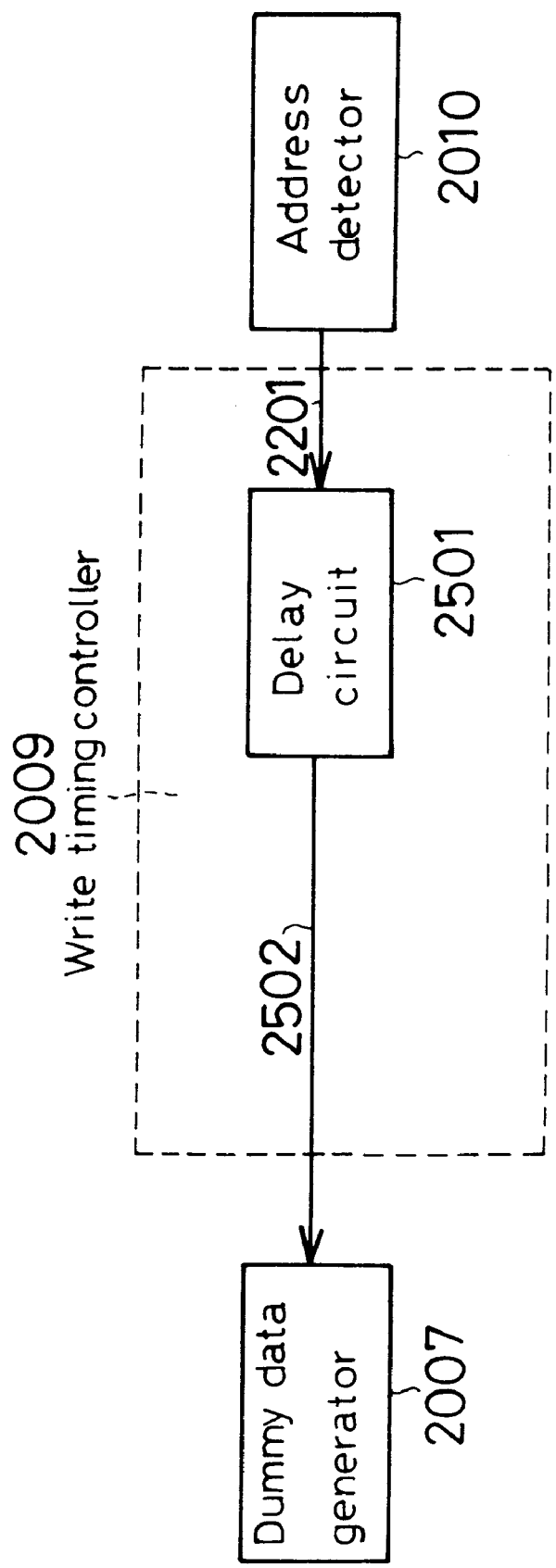
FIG. 25 is a block diagram of the write timing controller of the optical disk drive of a fifth embodiment according to the present invention.

FIG. 25 illustrates an example of a part of the write timing controller 2009 illustrated in FIG. 20, which controls write timing of the dummy data. The timing chart of the operation is showed in FIG. 26.

Figure 26:
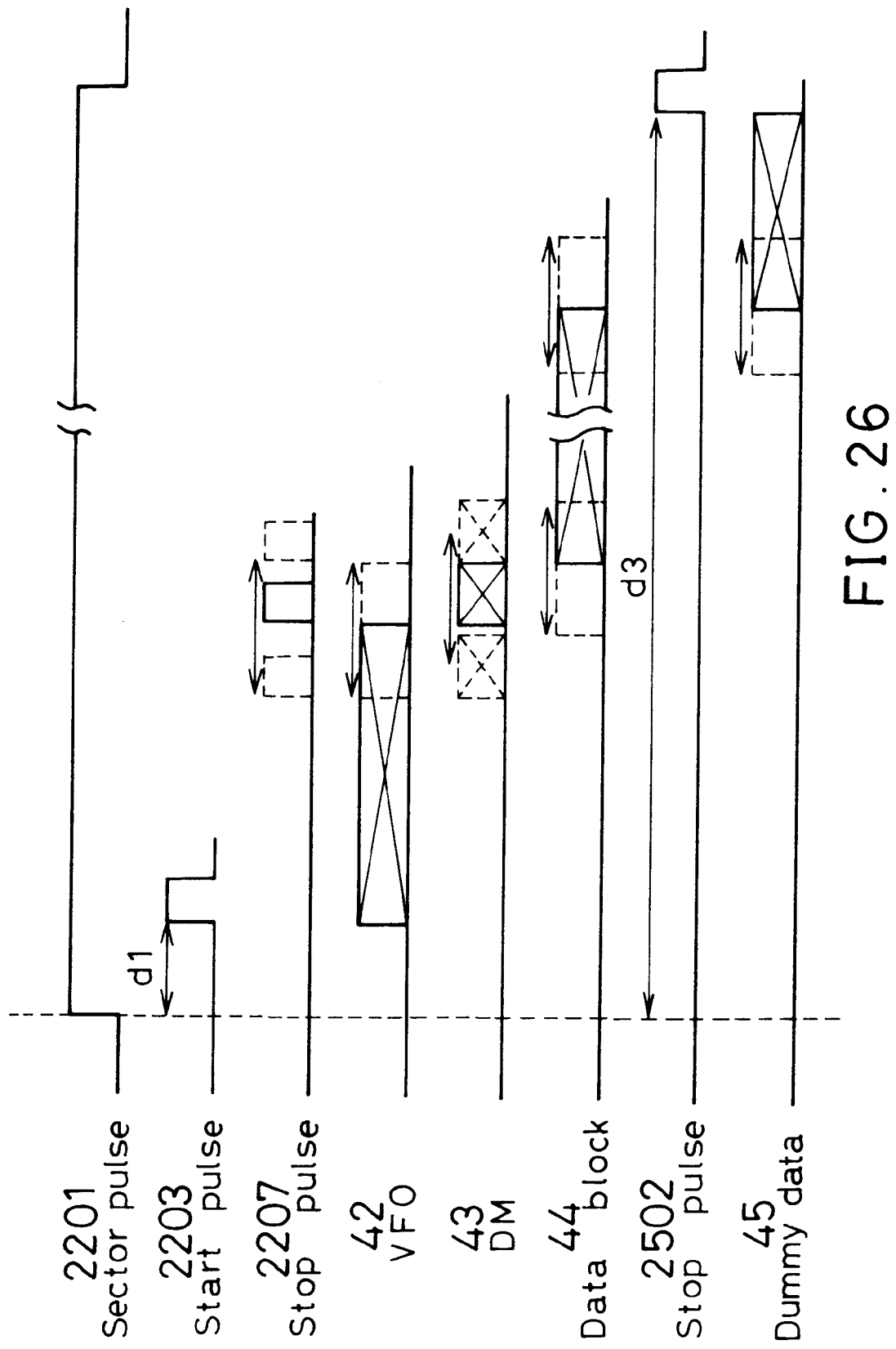
FIG. 26 is a timing chart showing the operation of the write timing controller illustrated in FIG. 25.

As mentioned above, the write timing controller 2009 gives trigger instructions to the synchronizing signal generator 2005, DM generator 2006, the data modulator 2004 and the dummy data generator 2007 in turn after the address detector detects the target address. Either the start pulse 2203 given to the synchronizing signal generator or the stop pulse 2207 is provided with a random delay time. FIG. 26 shows a case where the stop pulse 2207 is provided with the random delay time. On the other hand, the delay circuit 2501 of the write timing controller 2209 outputs a stop pulse 2502 to the dummy data generator 2007 at predetermined delay time d3 after receiving a sector pulse that indicates the sector period. After receiving the stop pulse 2502, the dummy data generator 2007 stops generating the dummy data. The delay time d3 generated in the delay circuit 2501 may be determined such that the deterioration of the read waveform at the end of the written data after writing repeatedly certain expected times can be absorbed in the dummy data so as to give no effect to the read data of the data block 44. Essentially, this embodiment provides the same end position of writing dummy data by means of the delay circuit 2501. However, it is not always possible to make the same end position of writing dummy data since the motor for rotating the optical disk has a certain flutter.

Figure 27:
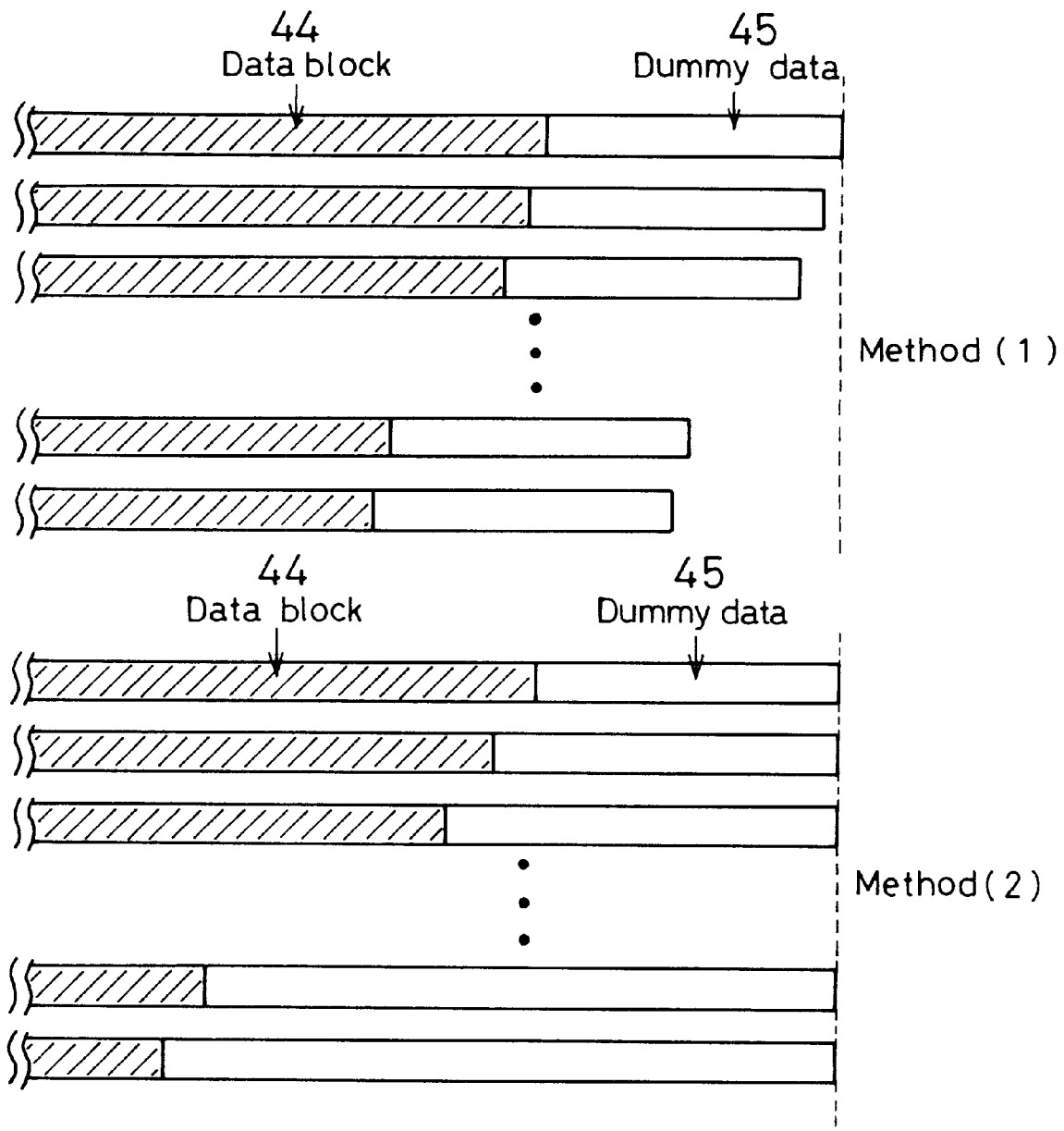
FIG. 27 is a chart showing a pattern of the dummy data recorded by the optical disk drive including the write timing controller illustrated in FIG. 25.

The comparison between the prior art and this embodiment concerning the deterioration suppression effect of the read waveform at the end of the write area after rewriting repeatedly at a sector will be explained below. FIG. 27 shows the variation of the dummy data position when writing repeatedly in a sector. Method(1) is the writing method in the prior art where the length of the dummy data 45 is not varied. Method(2) is the method in this embodiment where the length of the dummy data is varied such that the end position of the dummy data 45 is not varied on the disk. In FIG. 27, the position of the data head indicating mark is varied from the nearest to the farthest in order, but actually, it is varied at random.

If the shortest length of the dummy data 45 in Method(2) is set identical with the fixed length of the dummy data in the prior art, the Method(2) of this embodiment has an advantage because of the reason below. The average length of the dummy data 45 is longer than the fixed length of the dummy data 45 in the prior art. On the other hand, the deterioration due to the repeated recording starts from the end point of writing. Therefore the repeated recording life, i.e. the time when the deterioration reaches the end of the data block 44, is longer in this embodiment than in the prior art.

Sixth Embodiment

Next, a sixth embodiment will be explained. This embodiment is applied to the optical disk drive such that the optical disk is rotated at a constant revolution independently of the radius of the sector to be recorded. In this optical disk drive, linear speed of the irradiated point by the laser beam (i.e. writing point at present) changes according to the radius thereof.

Some experiments for finding how the linear speed at writing is related to the deterioration due to repeated rewriting were performed. First, it became clear that a small change in the disk construction, i.e. thickness of each layer, material composition, linear speed at writing, laser power or record density, results in a big change of the deterioration phenomenon due to repeated rewriting. This can be understood from the following facts;

(1) temperature profile (e.g. temperature to be reached, cooling speed after temperature increase) is affected strongly by the linear speed;

(2) an asymmetry of the temperature profile at the laser irradiated part is one of driving forces to create the deterioration of the read waveform due to the repeated rewriting.

The dependence of the deterioration phenomenon due to the repeated rewriting on the linear speed at writing could not be eliminated by changing the laser power or irradiation period according to the linear speed at writing, or by altering the disk construction according to the disk radius.

It is desirable for an optical disk system that the laser irradiation profile or the disk construction be adjusted so that a sum of deterioration lengths of the read signal due to the repeated rewriting at the head and the end of a chain of writing areas become as short as possible from the viewpoint of memory capacity. By the above experiment, the ratio of the deterioration length of the read waveform at the head and that at the end of the recording area due to the repeated writing was found to be varied usually according to the linear speed of writing. It is also found that the relationship of the above ratio and the linear speed of writing can not be defined as a linear function. The length of the synchronizing signal and the dummy data such that the deterioration of read waveform due to the repeated writing can not effect the reproduction of the data block is found to have the most adequate value that is unique to each disk system and that corresponds to the linear speed.

It is also found that the largest shift of the writing start point (the distance of data head indicating marks recorded nearest and farthest with the respect to ID) has the most adequate length corresponding to the linear speed of writing. The relationship of the most adequate largest shift of the data head indicating mark and the linear speed could not be defined as a linear function. The above mentioned method such as altering the length of the VFO at random without altering its start position of writing or altering the start position of VFO writing at random without altering its length can be used for altering the position of the data head indicating mark.

It is understood from the above mentioned experiment that the following three writing methods are effective for suppressing the deterioration of the read waveform:
(1) writing in turn the VFO, the data head indicating mark, encoded data, and dummy data if necessary, and altering the position of the data head indicating mark at random;
(2) writing while selecting the largest shift of the data head indicating mark and/or the average length of the synchronizing signal in a sector adequately corresponding to the linear speed at writing;
(3) writing while selecting the average length of the dummy data in a sector adequately corresponding to the linear speed at writing.

Usually, in an actual optical disk drive, the linear speed and the radius at writing correspond with each other. Therefore, the above Method(2) or (3) is performed by providing the optical disk drive with a conversion table of the most adequate largest shift of the data head indicating mark and/or the average length of the VFO and the average length of the dummy data for each recording radius, and writing a certain area according the conversion table.

Figure 28:
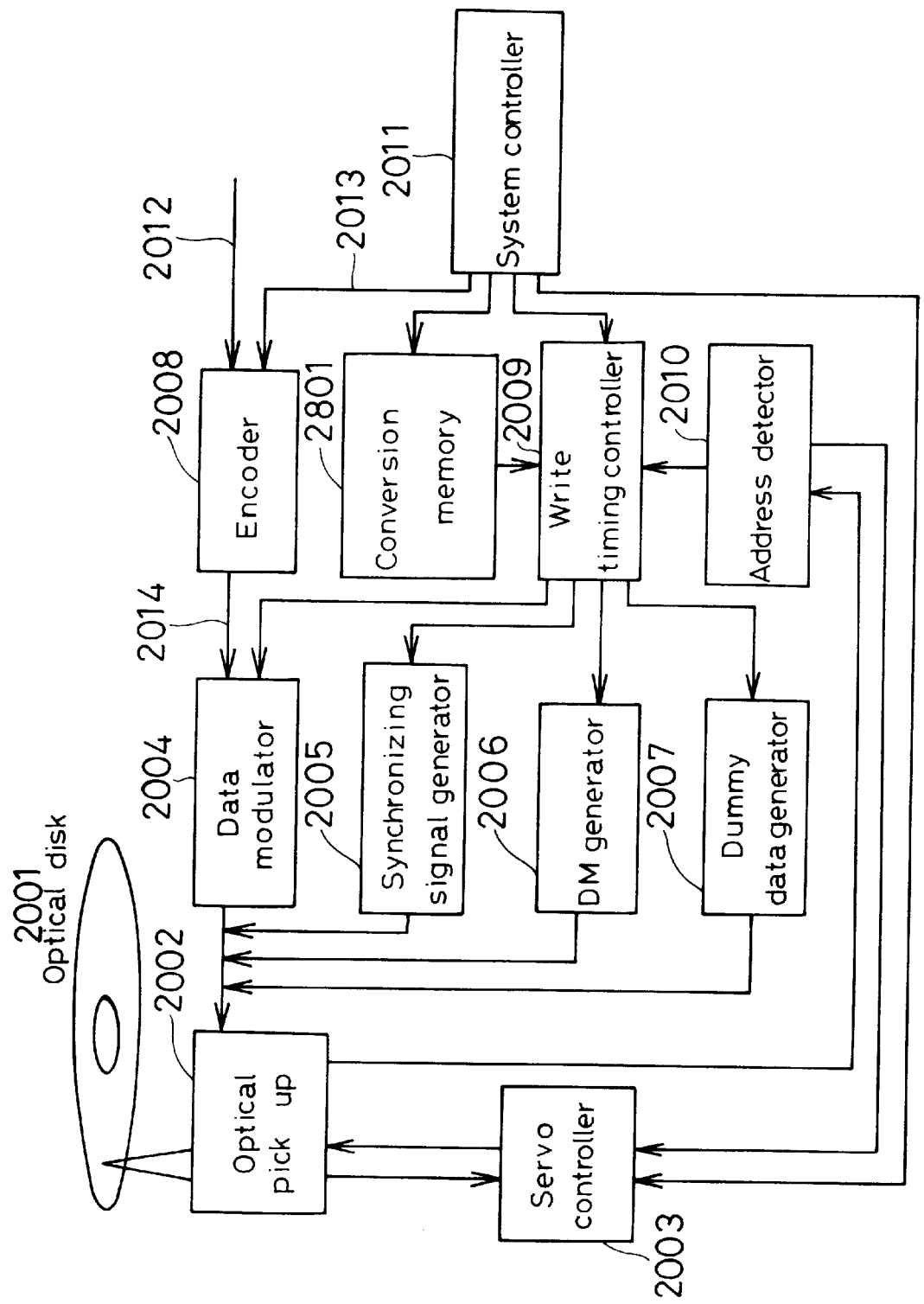
FIG. 28 is a block diagram illustrating the optical disk drive of a sixth embodiment according to the present invention.

A block diagram of an optical disk drive as a sixth embodiment of the invention is illustrated in FIG. 28. This optical disk drive can also record data in the record format illustrated in FIG. 21. The optical disk drive illustrated in FIG. 28 has a conversion memory 2801 that is used for conversion of the address, the synchronizing signal and recording method of the dummy data. The conversion memory 2801 is written with the most adequate largest shift of the data head indicating mark, the length of the VFO and the dummy data, and the end position of dummy data recording.

The above mentioned optical disk drive operates as below. The system controller 2011 gives the address of the target sector to be recorded to the servo controller 2003 and the conversion memory 2801. The servo controller 2003 compares the target address with an address detected by the address detector 2010 to control the position of the optical pick-up. The conversion memory 2801 gives the record format data corresponding to the target address to be recorded to the write timing controller 2009. The system controller 2011 gives an encoding instruction 2013 to the encoder 2008, and a writing instruction to the write timing controller 2009. The encoder 2008 encodes the data to be written 2012 with the error correction code and outputs the encoded data to the data modulator 2004. The data modulator 2004 modulates the encoded data 2014. The dummy data generator 2007 can be eliminated if the necessity of repeated writing is low.

The write timing controller 2009 gives trigger instructions in turn to the synchronizing signal generator 2005, the DM generator 2006, the data modulator 2004 and the dummy data generator 2007 according to the data from the conversion memory 2801 to record in turn the synchronizing signal that gives the most adequate largest shift of the data head indicating mark, modulated data, and the dummy data in the adequate length into the sector recording area 46. The address detector 2010 can give the address signal detected to the conversion memory 2801 just before the writing on behalf of the system controller 2011. Further, it is possible to prerecord the address and the writing method of VFO & dummy data table in the optical disk in spite of providing the conversion memory 2801 in the optical disk drive, and to write according to the information of the table.

As mentioned above, this embodiment can write while selecting the most adequate largest shift of the data head indicating mark and/or the average length of the synchronizing signal and the average length of the dummy data by providing the conversion memory for converting of the address and the recording method of VFO and dummy data. Consequently, the substantial recording capacity of the optical disk can be expanded without being affected by the deterioration of the read waveform due to the repeated rewriting.

Seventh Embodiment

Figure 29:
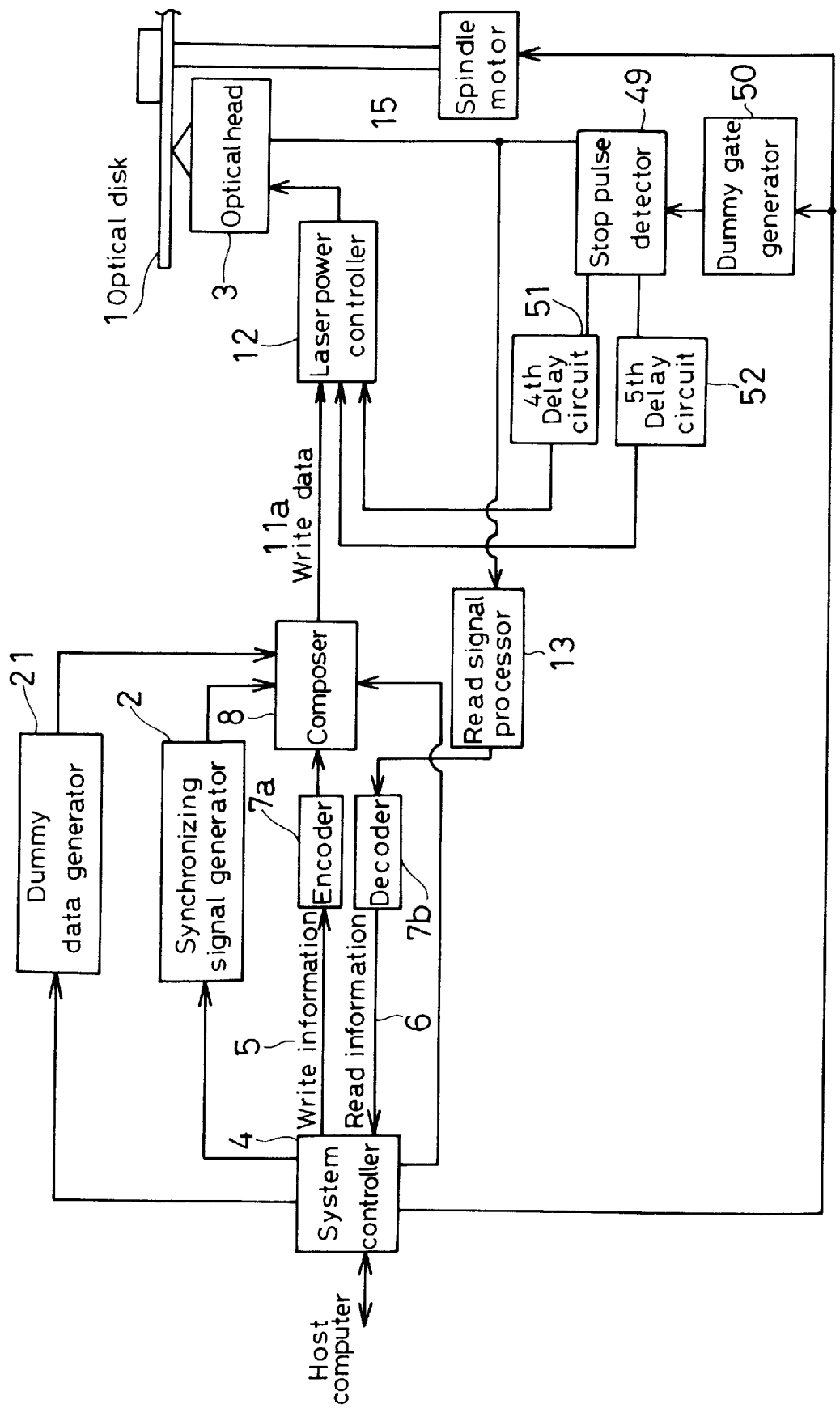
FIG. 29 is a block diagram illustrating the optical disk drive of a seventh embodiment according to the present invention.
Figure 30:
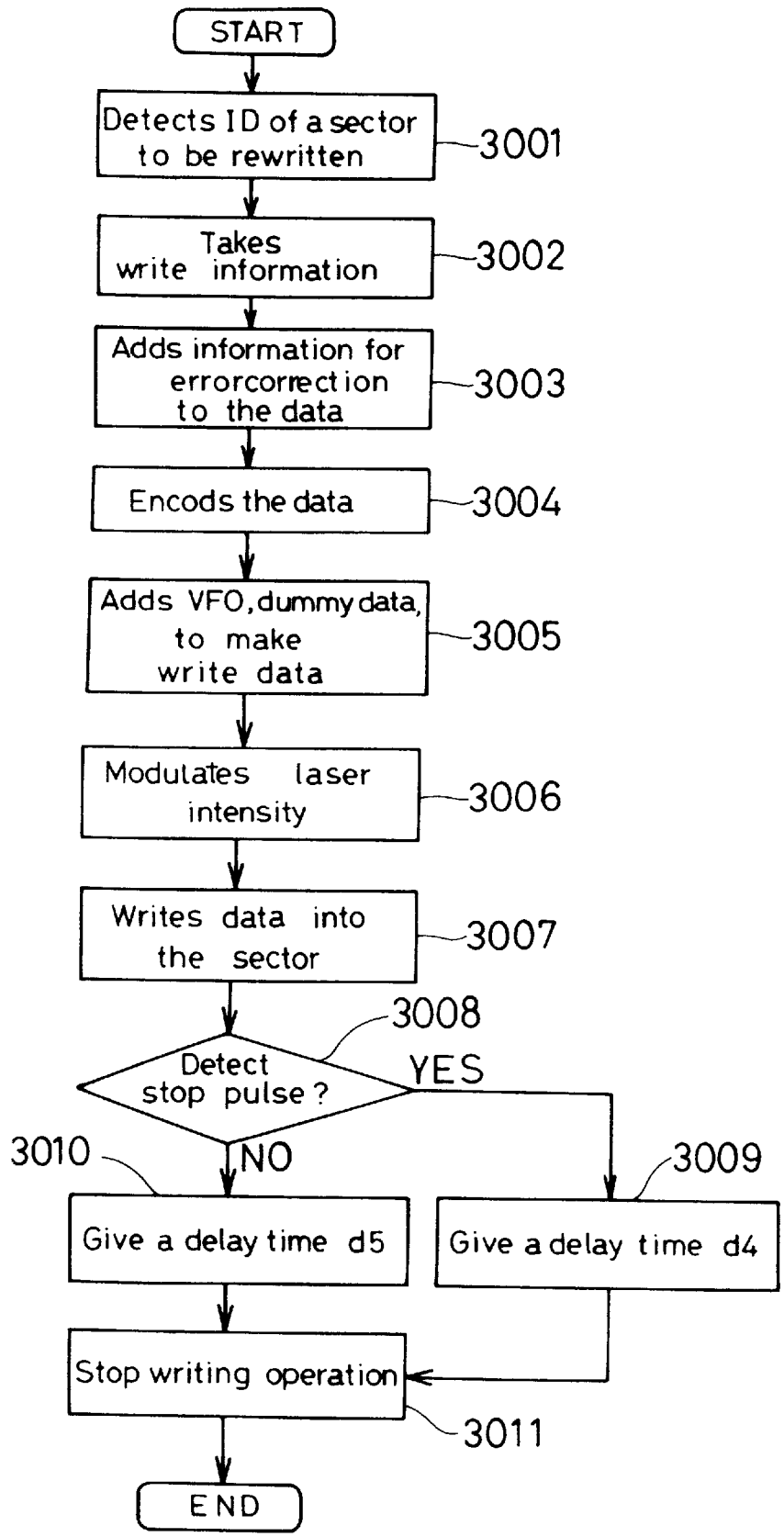
FIG. 30 is a flow chart of the operation performed by the optical disk drive illustrated in FIG. 29 for rewriting a sector of the optical disk.

A block diagram of a reader/writer as a seventh embodiment of the invention is illustrated in FIG. 29. A flow chart of the process to rewrite a sector performed by this reader/writer is illustrated in FIG. 30. After detecting ID (address data) of the sector to be rewritten in step 3001, a system controller 4 that is connected to a host computer outputs write information 5 in the form of binary data (step 3002). This write information 5 is provided with an information for error correction in step 3003 and it is encoded in step 3004. Each data block to be written in a sector is provided with a synchronizing signal from the synchronizing signal generator 2 and dummy data from the dummy data generator 21 to be write data 11a in the composer 8 (step 3005). The laser power controller 12 controls the laser housed in a optical head 3 according to the data to modulate the laser intensity (step 3006). Thus the data are written into the sector of the optical disk 1 (step 3007). The above operation of this reader/writer is similar to the prior art; the following operation is different.

While the above writing is performed, a stop pulse detector 49 detects the read signal that is a reflection of the light irradiated for writing (step 3008). The signal is detected as a partial change of reflection in the detecting period that is determined by the dummy gate generated by a dummy gate generator 50. After the stop pulse detector detects the signal, i.e. a stop pulse, a delay time generator 51 determines a delay time d4 (step 3009). After the delay time, the writing of the dummy data is stopped (step 3011). On the other hand, if the stop pulse detector 49 has not detected the stop pulse in the detecting period that is determined by the dummy gate generated by the dummy gate generator 50, the writing of dummy data is stopped after another delay time d5 that is determined by another delay circuit 52 (step 3010 and 3011). The above stop pulse is generated by altering the width or depth of the guide groove, or forming a prepit in the area that is close to the end writing area of the sector.

According to this invention, even if flutter has occurred in the motor for driving the optical disk, the write end positions for each sector can be arranged precisely. This can be performed since the stop pulse is near to the end position of the writing sector so that the period between the detection of the stop pulse and the reaching of the target position of the write end is smaller than the period between the write start point and the write end point of the sector. In the prior art, the writing was stopped after a certain time had passed from write starting, although actually the write end position can be varied for every writing due to the effect of the flutter of the motor. On the other hand, in the method by this invention such that the writing is stopped after a certain period has passed from the detection of the stop pulse, it is much easier than in the prior art to arrange the write end position. This can be explained in another way. Using this writing method, the recording area can be used completely without considering the effect of the flutter of the motor. Therefore the area of the dummy data can be set longer in this writing method than in the prior art.

If the detection of the stop pulse has failed due to a certain reason, the writing should be stopped before entering the ID area following the data area. Therefore, it is necessary to stop the writing considering the flutter of the motor if the stop pulse has not been detected when a certain time has passed. On the other hand, if the detection of the stop pulse begins too early, the error detection of the signal change as a stop pulse can stop the writing in the middle of correct writing. Therefore, it is enough to detect the stop pulse during the expected period of detecting stop pulse and the added period considered to be necessary for absorbing the motor flutter, etc. The dummy gate that the dummy gate generator 50 generates is used for performing the stop pulse detection in a certain period. The delay time d5 that is given the delay circuit 52 when the stop pulse detection has failed is set such that the write end position considered with the motor flutter is not after the write end position when the stop pulse has been detected successfully.

Figure 31:
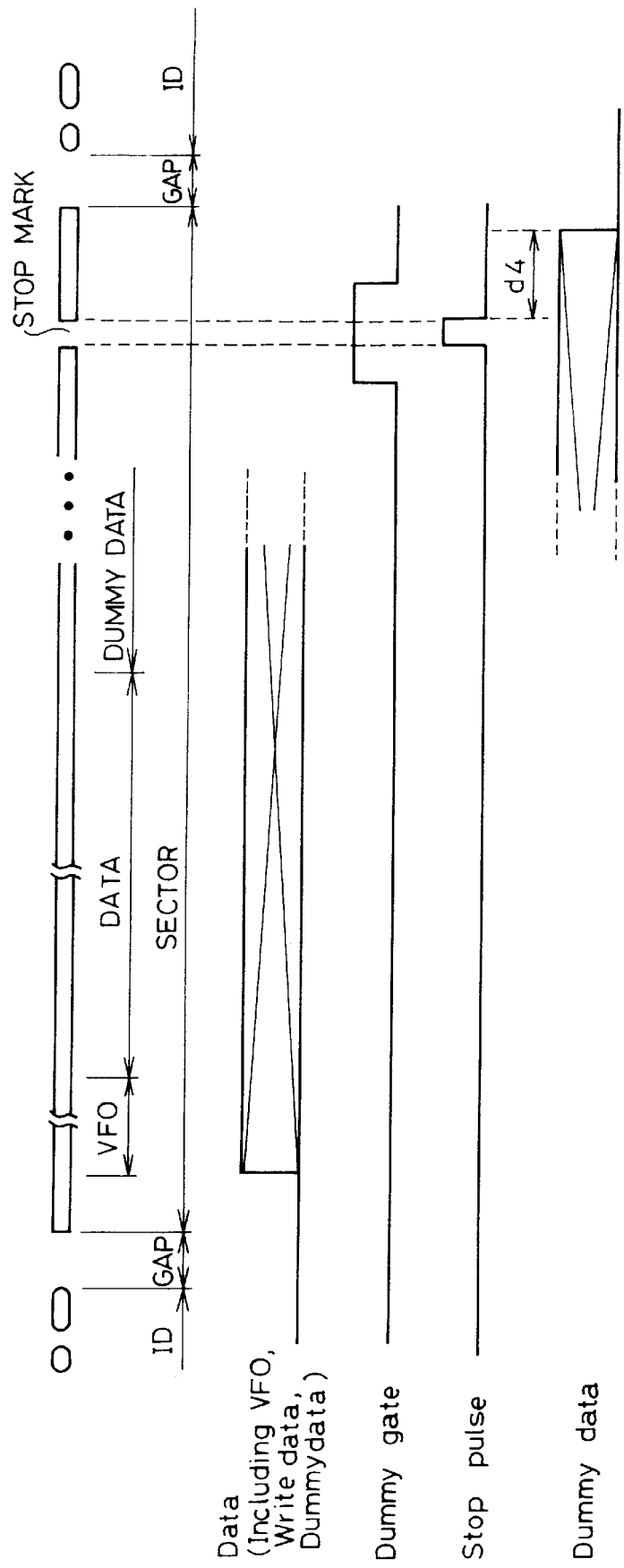
FIG. 31 is a timing chart for the stop pulse position and the written state of the optical disk in the optical disk drive illustrated in FIG. 29.

FIG. 31 shows an example of the writing operation into the optical disk. The writing of the dummy data is stopped after the delay time d4 has passed from the detection of the stop pulse if the stop pulse is detected as e.g. a breaking part of the guide groove.

Figure 32:
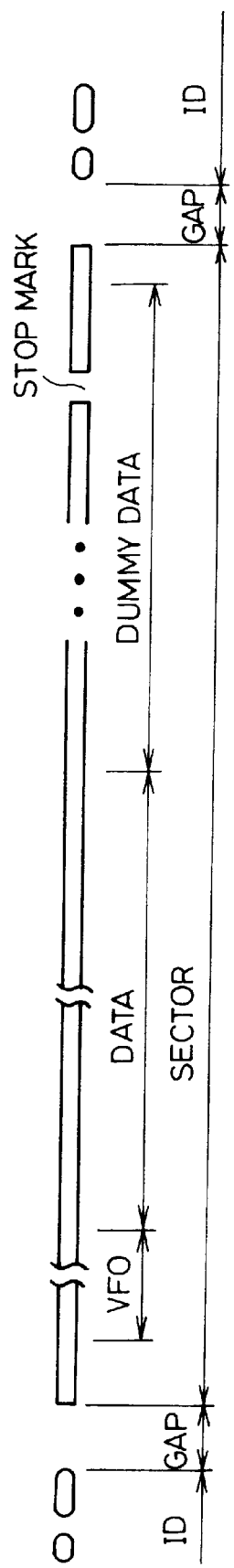
FIG. 32 is a chart showing a shape example of a guide groove for the optical information recording medium of the seventh embodiment according to the present invention.
Figure 33:
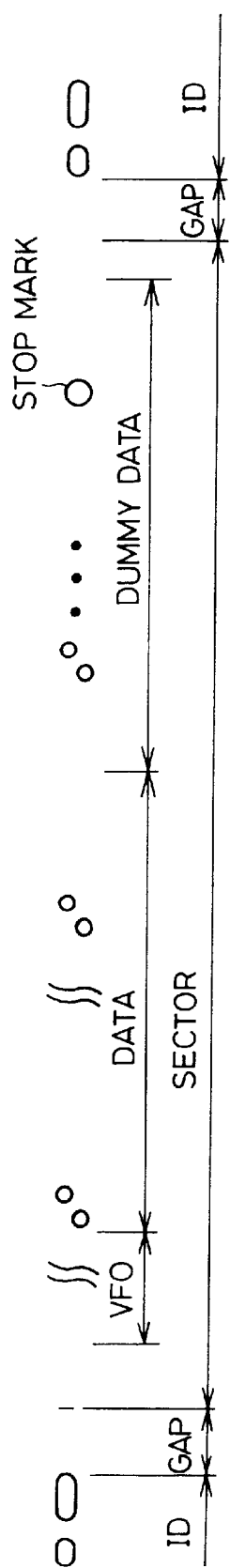
FIG. 33 is a chart showing a shape example of a prepit on the optical information recording medium of the seventh embodiment according to the present invention.

A concrete example will be explained below. The optical disk having the structure mentioned in the first embodiment was written repeatedly under the condition mentioned in the first embodiment. The write end position (i.e., the distance to the next ID) was measured. The stop pulse generating position was determined as the position that divides each sector into 20:1 (latter part of the sector). FIGS. 32 and 33 show an example of the optical disk written by this embodiment. The stop pulse is detected at the breaking part of the guide groove as the stop mark in FIG. 32. Using such an optical disk of FIG. 32, it is possible to detect the stop pulse in the writing operation. It is checked that the variation of the write end position in a sector by this writing method is reduced to a twentieth compared with the writing method by the prior art.

It is also possible to detect the stop pulse by narrowing or shallowing the groove at the point in the optical disk having a guide groove.

If the optical disk of the sample servo type is used, it is possible to detect the stop pulse by forming a larger prepit than other prepits at the area close to the write end area as illustrated in FIG. 33, and by detecting the signal from the larger prepit as a stop pulse.

Although the present invention has been explained with reference to embodiments, it is naturally understood that the present invention is not limited to the embodiments described herein and can be applied in any other embodiments as long as objects of the present invention can be achieved.

What is claimed is:

1. A recording and reproducing method for an optical information recording medium in which a light beam is irradiated to change a state of a photo-sensitive record layer corresponding to binary data, comprising the steps of
deciding at random to invert or not to invert write data that has a predetermined block length;
inverting the write data if the decision is to invert the write data; and
recording either the non-inverted write data or the inverted write data into the photo-sensitive record layer.

2. The recording and reproducing method for an optical information recording medium according to claim 1, wherein the binary data is written with a pulse width modulation.

3. The recording and reproducing method for an optical information recording medium according to claim 1, wherein a start point of recording in a sector of the recording medium is altered at random.

4. A recording and reproducing method for an optical information recording medium in which a light beam is irradiated to change a state of a photo-sensitive record layer, comprising providing write data to be recorded into each sector of the optical information recording medium that includes original write data and dummy data added to the head of the original write data, and selecting a ratio of a recorded mark distance and a recorded mark length for the dummy data that is larger nearer to the head of the dummy data.

5. The recording and reproducing method for an optical information recording medium according to claim 4, wherein a synchronizing signal is included at the head of the original write data, and wherein a recorded mark distance and a recorded mark length at the end of the dummy data are identical with a recorded mark distance and a recorded mark length of the synchronizing signal.

6. The recording and reproducing method for an optical information recording medium according to claim 4, wherein a start point of recording in each sector is altered at random.

7. The recording and reproducing method for an optical information recording medium according to claim 4, further comprising the steps of
deciding at random to invert or not to invert write data that has a predetermined block length;
inverting the write data if the decision is to invert the write data; and
recording either the non-inverted write data or the inverted write data into the photo-sensitive record layer.

8. A recording and reproducing method for an optical information recording medium in which a light beam is irradiated to change a state of a photo-sensitive record layer, comprising providing write data to be recorded into each sector of the optical information recording medium that includes original write data and dummy data following the original write data, and selecting a ratio of a recorded mark distance and a recorded mark length for the dummy data that is larger nearer to the end of the dummy data.

9. A recording and reproducing method for an optical information recording medium in which a light beam is irradiated to change a state of a photo-sensitive record layer, wherein write data to be recorded includes original write data and dummy data following the original write data and the light intensity is decreased slowly in the area of the dummy data after the write data to be recorded into each sector of the optical information recording medium.

10. A recording and reproducing method for an optical information recording medium in which a light beam is irradiated to change a state of a photo-sensitive record layer, wherein write data to be recorded into each sector of the optical information recording medium include a synchronizing signal, a data head indicating mark added to the end of the synchronizing signal, original write data following the data head indicating mark, and dummy data added to the end of the original write data, and wherein a length of the dummy data is altered according to a position of the data head indicating mark.

11. The recording and reproducing method for an optical information recording medium according to claim 10, wherein a length of the dummy data is altered so that a record end position of the dummy data in a sector is substantially fixed.

12. A recording and reproducing method for an optical information recording medium in which a light beam is irradiated to change a state of a photo-sensitive record layer, wherein write data to be recorded into each sector of the optical information recording medium include a synchronizing signal, a data head indicating mark added to the end of the synchronizing signal, and original write data following the data head indicating mark, and wherein a position of the data head indicating mark is altered in a predetermined range at every recording, and wherein a largest position shift of the data head indicating mark is altered according to a record radius.

13. A recording and reproducing method for an optical information recording medium in which a light beam is irradiated to change a state of a photo-sensitive record layer, wherein write data to be recorded into each sector of the optical information recording medium include a synchronizing signal, a data head indicating mark added to the end of the synchronizing signal, and original write data following the data head indicating mark, and wherein a position of the data head indicating mark is altered in a predetermined range at every recording, and wherein an average length of the synchronizing signal area is altered according to a record radius.

14. A recording and reproducing method for an optical information recording medium in which a light beam is irradiated to change a state of a photo-sensitive record layer, wherein write data to be recorded into each sector of the optical information recording medium includes a synchronizing signal, a data head indicating mark added to the end of the synchronizing signal, original write data following the data head indicating mark, and dummy data added to the end of the original data, and wherein a length of the dummy data in each sector is altered in predetermined range at every recording, and wherein an average length of the dummy data is altered according to a record radius.

15. A recording and reproducing apparatus for an optical information recording medium in which a light beam is irradiated to change a state of a photo-sensitive record layer corresponding to a binary data, comprising means for encoding write information of predetermined block length into write data.

means for selecting at random either the non-inverted write data or the inverted write data; and means for controlling the light irradiation energy according to an output of the selecting means.

16. A recording and reproducing apparatus for an optical information recording medium in which a light beam is irradiated to change a state of a photo-sensitive record layer, comprising means for encoding write information of predetermined block length into write data;

means for generating dummy data whose ratio of a record pulse distance and a record pulse length is larger nearer to a head of the dummy data;

means for composing the write data and the dummy data by adding the dummy data to a head of the write data; and means for controlling the light irradiating energy according to an output of the composing means.

17. A recording and reproducing apparatus for an optical information recording medium in which a light beam is irradiated to change a state of a photo-sensitive record layer, comprising means for encoding a write information of predetermined block length into write data;

means for generating dummy data whose ratio of a record pulse distance and a record pulse length is larger nearer to an end of the dummy data;

means for composing the write data and the dummy data by adding the dummy data to an end of the write data; and means for controlling the light irradiating energy according to an output of the composing means.

18. A recording and reproducing apparatus for an optical information recording medium in which a light beam is irradiated to change a state of a photo-sensitive record layer, comprising means for encoding write information of predetermined block length into write data;

a first controller that controls the light irradiating energy according to the write data; and a second controller that decreases the light irradiating energy slowly in a dummy data area after the write data.

19. A recording and reproducing apparatus for an optical information recording medium in which a light beam is irradiated to change a state of a photosensitive record layer, comprising:

means for recording in turn a synchronizing signal, a data head indicating mark and original write data;

means for fixing a record start point of the synchronizing signal; and means for altering a length of the synchronizing signal in a predetermined range at every recording, wherein the altering means of the length of the synchronizing signal includes a synchronizing signal generator that starts and stops the synchronizing signal triggered by a input pulse; and a random selector that gives a random delay time to the input pulse for the synchronizing signal generator.

20. A recording and reproducing apparatus for an optical information recording medium in which a light beam is irradiated to change a state of a photo-sensitive record layer, comprising means for recording in turn a synchronizing signal, a data head indicating mark, original write data and dummy data; and means for altering a length of the dummy data according to a position of the data head indicating mark.

21. The recording and reproducing apparatus for an optical information recording medium according to claim 21, wherein the apparatus includes means for adjusting a record end position of the dummy data in a sector of the optical information recording medium so as to be substantially fixed.

22. A recording and reproducing apparatus for an optical information recording medium in which a light beam is irradiated to change a state of a photo-sensitive record layer, comprising means for recording in turn a synchronizing signal, a data head indicating mark and original write data;

means for altering a position of the data head indicating mark in a predetermined range at every recording; and means for altering a largest position shift of the data head indicating mark according to a record radius.

23. A recording and reproducing apparatus for an optical information recording medium in which a light beam is irradiated to change a state of a photo-sensitive record layer, comprising means for recording in turn a synchronizing signal; a data head indicating mark and original write data;

means for altering a position of the data head indicating mark in a predetermined range at every recording; and means for altering an average length of the synchronizing signal area according to a record radius.

24. A recording and reproducing apparatus for an optical information recording medium in which a light beam is irradiated to change a state of a photo-sensitive record layer, comprising means for recording in turn a synchronizing signal, a data head indicating mark, original write data and dummy data; and means for altering an average length of the dummy data according to a record radius.

\* \* \* \* \*

UNITED STATES PATENT AND TRADEMARK OFFICE
CERTIFICATE OF CORRECTION

PATENT NO. : 6,487,151 B1
DATED : November 26, 2002
INVENTOR(S) : Nagata et al.

It is certified that error appears in the above-identified patent and that said Letters Patent is hereby corrected as shown below:

Column 3,
Line 40, "object" should read -- objective --
Line 45, "object," should read -- objective, --

Column 4,
Line 7, "closes" should read -- closest --

Column 7,
Line 43, "A1;" should read -- A1; --
Line 64, "a represents" should read -- σ represents --

Column 10,
Line 52, "a sector. is" should read -- a sector is --

Column 13,
Line 38, "encode instruction 2013 to the encoder 2013" should read -- encode instruction 2013 to the encoder 2008 --

Column 14,
Line 26, "VF0" shold read -- VFO --

Column 22,
Lines 48-49, "claim 21, wherein" should read -- claim 20, wherein --

Signed and Sealed this

Twenty-first Day of October, 2003

JAMES E. ROGAN
*Director of the United States Patent and Trademark Office*